(12) United States Patent
Hessenberger et al.

(10) Patent No.: US 7,438,095 B2
(45) Date of Patent: Oct. 21, 2008

(54) ROUTER

(75) Inventors: Jeffrey C. Hessenberger, Neosho, WI (US); Jeffrey S. Holly, Menomonee Falls, WI (US); Melissa Ottens-Rendon, Waukesha, WI (US); Christopher Berg, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 11/567,137

(22) Filed: Dec. 5, 2006

(65) Prior Publication Data

US 2007/0095429 A1    May 3, 2007

Related U.S. Application Data

(63) Continuation of application No. 10/644,720, filed on Aug. 20, 2003, now abandoned.

(60) Provisional application No. 60/405,167, filed on Aug. 21, 2002.

(51) Int. Cl.
*B27C 5/10* (2006.01)
*B27G 21/00* (2006.01)

(52) U.S. Cl. .............. 144/136.95; 144/154.5; 144/252.1; 409/182; 409/137

(58) Field of Classification Search ........... 144/48.5, 144/136.95, 154.5, 252.1, 252.2; 409/137, 409/182; 310/50; 408/67
See application file for complete search history.

(56) References Cited

U.S. PATENT DOCUMENTS

| 542,568 A | 7/1895 | Miller |
|---|---|---|
| 712,843 A | 11/1902 | Paul |
| 1,581,720 A | 4/1926 | Carter |
| 1,586,412 A | 5/1926 | Curtis |
| 1,820,162 A | 8/1931 | Salvat |
| 2,504,880 A | 4/1950 | Rittenhouse |
| 2,513,894 A | 7/1950 | Rogers |
| 2,630,152 A | 3/1953 | Turnbull |
| 2,799,305 A | 7/1957 | Groehn |
| 2,842,173 A | 7/1958 | Turner et al. |
| 2,943,654 A | 7/1960 | Emmons |

(Continued)

FOREIGN PATENT DOCUMENTS

GB    1 147 630    4/1969

(Continued)

*Primary Examiner*—Shelley Self
(74) *Attorney, Agent, or Firm*—Michael Best & Friedrich LLP

(57) ABSTRACT

A power tool, such as, for example a router. In some aspects, a power tool includes a motor, a motor housing defining an air outlet, and a shield connectable to the motor housing and positionable to at least partially cover the air outlet to inhibit movement of debris into the motor housing through the air outlet. In some aspects of the invention, a router includes a base, a motor housing supported by the base, at least one of the base and the motor housing defining a depth adjustment column having an open end, a motor supported by the motor housing and operable to drive a tool element, a depth adjustment mechanism supported in the depth adjustment column and operable to adjust the cutting depth of the tool element, and a flexible shield connectable to the base in a position to cover the open end and to allow access to the depth adjustment mechanism through the open end.

38 Claims, 47 Drawing Sheets

U.S. PATENT DOCUMENTS

| | | | |
|---|---|---|---|
| 3,289,718 A | 12/1966 | Willis | |
| 3,363,510 A | 1/1968 | Burrows et al. | |
| 3,451,133 A | 6/1969 | Hathaway et al. | |
| 3,466,973 A | 9/1969 | Rees | |
| 3,481,453 A | 12/1969 | Shreve III, et al. | |
| 3,487,747 A | 1/1970 | Burrows et al. | |
| 3,489,191 A | 1/1970 | Blevins | |
| 3,490,502 A | 1/1970 | Willis | |
| 3,494,395 A | 2/1970 | Graham | |
| 3,512,740 A | 5/1970 | Podwalny | |
| 3,587,387 A | 6/1971 | Burrows et al. | |
| 3,710,833 A | 1/1973 | Hammer et al. | |
| 3,767,876 A | 10/1973 | Batson | |
| 3,767,948 A * | 10/1973 | Batson | 310/50 |
| 3,786,846 A | 1/1974 | Mehring | |
| 3,827,820 A | 8/1974 | Hoffman | |
| 3,905,273 A | 9/1975 | Shook | |
| 4,051,880 A | 10/1977 | Hestily | |
| 4,085,552 A | 4/1978 | Horine et al. | |
| 4,108,225 A | 8/1978 | Hestily | |
| 4,239,428 A | 12/1980 | Berzina | |
| 4,244,406 A | 1/1981 | Stielper | |
| 4,252,164 A | 2/1981 | Norlander | |
| D262,185 S | 12/1981 | Huber et al. | |
| 4,319,860 A | 3/1982 | Beares | |
| D267,492 S | 1/1983 | Schieber | |
| 4,410,022 A | 10/1983 | Peterson | |
| 4,455,023 A | 6/1984 | Saloom | |
| 4,461,330 A | 7/1984 | Judkins | |
| 4,510,404 A | 4/1985 | Barrett et al. | |
| 4,513,381 A | 4/1985 | Houser, Jr. et al. | |
| 4,537,234 A | 8/1985 | Onsrud | |
| D281,218 S | 11/1985 | Barrett et al. | |
| 4,562,872 A | 1/1986 | Fushiya et al. | |
| 4,593,466 A | 6/1986 | O'Brien | |
| D286,132 S | 10/1986 | Yamamoto | |
| 4,615,654 A | 10/1986 | Shaw | |
| 4,636,961 A | 1/1987 | Bauer | |
| 4,652,191 A | 3/1987 | Bernier | |
| 4,679,606 A | 7/1987 | Bassett | |
| 4,718,468 A | 1/1988 | Cowman | |
| 4,738,571 A | 4/1988 | Olson et al. | |
| 4,770,573 A | 9/1988 | Monobe | |
| 4,776,374 A | 10/1988 | Charlebois | |
| D300,501 S | 4/1989 | Zurwelle | |
| 4,830,074 A | 5/1989 | Lundblom | |
| 4,872,550 A | 10/1989 | Stranges | |
| D304,543 S | 11/1989 | Somers et al. | |
| 4,919,176 A | 4/1990 | Gachet et al. | |
| 4,924,571 A | 5/1990 | Albertson | |
| 4,938,642 A | 7/1990 | Imahashi et al. | |
| 5,012,582 A | 5/1991 | Bristol | |
| 5,062,460 A | 11/1991 | DeLine | |
| 5,074,724 A | 12/1991 | McCracken | |
| 5,078,557 A | 1/1992 | McCracken | |
| D323,935 S | 2/1992 | Ward | |
| 5,088,865 A | 2/1992 | Beth et al. | |
| D326,597 S | 6/1992 | Lee | |
| 5,117,879 A | 6/1992 | Payne | |
| 5,139,061 A | 8/1992 | Neilson | |
| 5,181,813 A | 1/1993 | McCracken | |
| 5,188,492 A | 2/1993 | McCracken | |
| 5,191,921 A | 3/1993 | McCurry | |
| D337,501 S | 7/1993 | Witt | |
| D340,174 S | 10/1993 | Hoshino et al. | |
| D341,305 S | 11/1993 | Svetlik | |
| 5,265,657 A | 11/1993 | Matsumoto et al. | |
| 5,273,089 A | 12/1993 | Fuchs et al. | |
| 5,310,296 A | 5/1994 | McCurry | |
| D349,637 S | 8/1994 | Hoshino et al. | |
| 5,347,684 A | 9/1994 | Jackson | |
| 5,353,474 A | 10/1994 | Good et al. | |
| D352,048 S | 11/1994 | Goebel | |
| 5,361,851 A | 11/1994 | Fox | |
| 5,368,424 A | 11/1994 | Bettenhausen | |
| 5,375,636 A | 12/1994 | Bosten et al. | |
| 5,429,235 A | 7/1995 | Chen | |
| 5,445,479 A | 8/1995 | Hillinger | |
| 5,452,751 A | 9/1995 | Engler, III et al. | |
| 5,469,601 A | 11/1995 | Jackson | |
| 5,511,445 A | 4/1996 | Hildebrandt | |
| 5,584,620 A | 12/1996 | Blickhan et al. | |
| 5,590,989 A | 1/1997 | Mulvihill | |
| 5,598,892 A | 2/1997 | Fox | |
| 5,613,305 A * | 3/1997 | Narrin | 34/90 |
| 5,632,578 A | 5/1997 | McCurry et al. | |
| 5,640,741 A | 6/1997 | Yano | |
| 5,662,440 A | 9/1997 | Kikuchi et al. | |
| 5,671,789 A | 9/1997 | Stolzer et al. | |
| 5,678,965 A | 10/1997 | Strick | |
| 5,725,036 A | 3/1998 | Walter | |
| 5,725,038 A | 3/1998 | Tucker et al. | |
| 5,758,702 A | 6/1998 | Adams | |
| 5,803,684 A | 9/1998 | Wang | |
| 5,853,273 A | 12/1998 | Coffey | |
| 5,853,274 A | 12/1998 | Coffey et al. | |
| D407,617 S | 4/1999 | Cooper et al. | |
| 5,909,987 A | 6/1999 | Coffey et al. | |
| 5,918,652 A | 7/1999 | Tucker | |
| D416,460 S | 11/1999 | Bosten et al. | |
| 5,988,241 A | 11/1999 | Bosten et al. | |
| 5,993,124 A | 11/1999 | Cooper et al. | |
| 5,997,225 A | 12/1999 | Young et al. | |
| 5,998,897 A | 12/1999 | Bosten et al. | |
| 6,065,912 A | 5/2000 | Bosten et al. | |
| 6,079,915 A | 6/2000 | Bosten et al. | |
| 6,113,323 A | 9/2000 | Bosten et al. | |
| 6,139,229 A | 10/2000 | Bosten et al. | |
| 6,158,930 A | 12/2000 | Etter | |
| 6,182,723 B1 | 2/2001 | Bosten et al. | |
| 6,226,877 B1 | 5/2001 | Ono | |
| 6,261,036 B1 | 7/2001 | Bosten et al. | |
| D450,230 S | 11/2001 | Long et al. | |
| 6,318,936 B1 | 11/2001 | McFarlin, Jr. et al. | |
| 6,354,016 B1 * | 3/2002 | Cafaro | 34/98 |
| D461,389 S | 8/2002 | Hsiao | |
| 6,443,675 B1 | 9/2002 | Kopras et al. | |
| 6,488,455 B1 | 12/2002 | Staebler et al. | |
| D473,439 S | 4/2003 | Grant et al. | |
| 2002/0043296 A1 | 4/2002 | Daniels et al. | |
| 2002/0164223 A1 | 11/2002 | Ryan et al. | |

FOREIGN PATENT DOCUMENTS

| | | |
|---|---|---|
| GB | 1 452 163 | 10/1976 |
| GB | 2 062 361 | 5/1981 |
| GB | 2 112 585 | 7/1983 |
| GB | 2 278 736 | 12/1994 |

* cited by examiner

FIG. 49
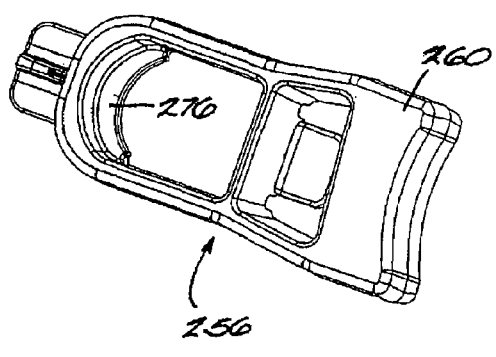
FIG. 50
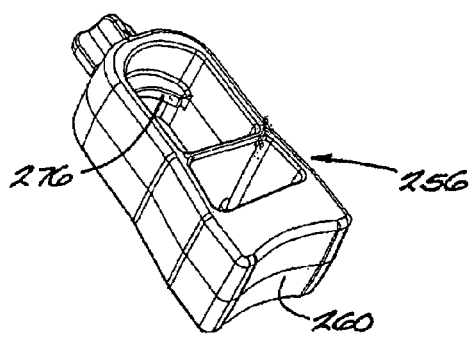
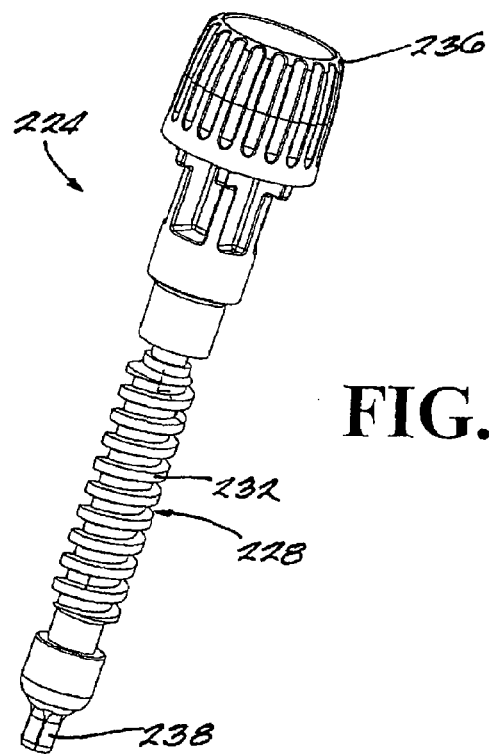
FIG. 51

ROUTER

RELATED APPLICATIONS

The present application is a continuation of U.S. patent application Ser. No. 10/644,720, filed Aug. 20, 2003, now abandoned which claims the benefit of prior-filed U.S. Provisional Patent Application Ser. No. 60/405,167, filed Aug. 21, 2002, the contents of all are hereby incorporated by reference.

FIELD OF THE INVENTION

The invention relates to power tools and, more particularly, to routers.

BACKGROUND OF THE INVENTION

A router generally includes a base for supporting the router on a workpiece surface, a housing supported by the base and movable relative to the base, and a motor supported by the housing and operable to drive a tool element. In a fixed-base router, the housing is fixed or locked in a position relative to the base once the depth of cut of the tool element is set. In a plunge router, the housing is movable relative to the base to the desired depth of cut so that the tool element "plunges" into the workpiece.

SUMMARY OF THE INVENTION

Typically, a router is used in a normal or upright position above the workpiece. Some routers may be supported and operated in an inverted position below a support member, such as, for example, a table.

To provide airflow from the motor housing, the motor housing is formed with outlet openings defined by spaced-apart fixed blades or fins. Typically, the fixed blades are fairly thick to accommodate die-casting process for forming the motor housing and to provide the necessary support for a bearing supporting the motor shaft. To provide the necessary air flow, the openings between the blades must be relatively large. The thickness and spacing of the blades are optimized to accommodate the die-casting process, to provide the necessary support for the bearing and the motor shaft and to provide the necessary airflow from the motor housing. Such an optimized solution may be less desirable for other considerations. The openings may allow debris to enter the motor housing, especially when the router is supported in the inverted position and when air is not flowing from the openings. For example, to prevent debris contamination and infiltration into the motor housing, and, for such other considerations, other dimensions may be more desirable for the thickness and spacing of the fixed blades.

In some inverted routers, the cutting depth of the tool element or cutting bit may be adjusted from above the table. An adjustment member may extend through the support surface or table to engage a depth adjustment shaft to provide movement of the motor housing relative to the base and/or to the table. To allow for engagement between the adjustment member and the depth adjustment shaft, an opening is provided for access into the bottom of the depth adjustment column. When the adjustment member is not present (i.e., after the depth has been adjusted in an inverted position and cutting operations are being conducted or when the router is used in the normal, upright position), debris may enter the depth adjustment column and potentially interfere with operation of the depth adjustment assembly.

The apparatus of the present invention substantially alleviates, in aspects of the invention, one or more independent problems with existing routers and power tools. In some aspects and in some constructions, the invention provides a shield to inhibit entry of debris into the motor housing of a power tool, such as a router. In some aspects and in some constructions, the invention provides a flexible shield to inhibit entry of debris into a depth adjustment column of a router. In some aspects and in some constructions, the invention provides an angled and/or curved handle for a power tool, such as a router.

More particularly, in some aspects and in some constructions, the invention provides a power tool including a motor, a motor housing operable to support the motor and defining an air outlet and an air flow path from the motor housing through the air outlet, and a shield removably connectable to the motor housing and positionable to at least partially cover the air outlet. In some constructions, the power tool is a router.

Also, in some aspects and in some constructions, the invention provides a router including a base, a motor housing supported by the base and defining an air outlet, air passing from the motor housing through the air outlet, a motor supported by the motor housing, and a shield connectable to the motor housing in a position to at least partially cover the air outlet.

In addition, in some aspects and in some constructions, the invention provides a contamination shield for a power tool, the power tool including a motor and an air outlet, the contamination shield including a connecting structure for connecting to the power tool and a plurality of blades spaced apart from one another to define openings therebetween, the contamination shield being positionable to at least partially cover the air outlet.

In some constructions, the plurality of blades is a plurality of radially extending blades. In some constructions, the contamination shield is substantially circular.

Further, in some aspects and in some constructions, the invention provides a router including a base, a motor housing supported by the base and movable relative to the base, the motor housing defining a depth adjustment column having an open end, a motor supported by the motor housing and operable to drive a tool element, a depth adjustment mechanism supported in the depth adjustment column and being operable to adjust the cutting depth of the tool element, and a flexible shield connectable to the base in a position to cover the open end and to allow access to the depth adjustment mechanism through the open end.

Also, in some aspects and in some constructions, the invention provides a router including a base, a motor housing supported by the base and defining a generally vertical motor housing axis, a motor supported by the motor housing, and a handle connected to at least one of the base and the motor housing, the handle defining a handle axis and having a grip portion extending generally along the handle axis, the handle axis being non-parallel to the motor housing axis.

Independent features and independent advantages of the present invention will become apparent to those skilled in the art upon review of the following detailed description and drawings.

BRIEF DESCRIPTION OF THE DRAWINGS

FIG. 49 is a top perspective view of a lock frame of the routers shown in FIGS. 1 and 4.

FIG. 50 is a top perspective view of the lock frame shown in FIG. 49.

FIG. 51 is a top perspective view of a depth adjustment mechanism of the routers shown in FIGS. 1 and 4.

Figure 1:
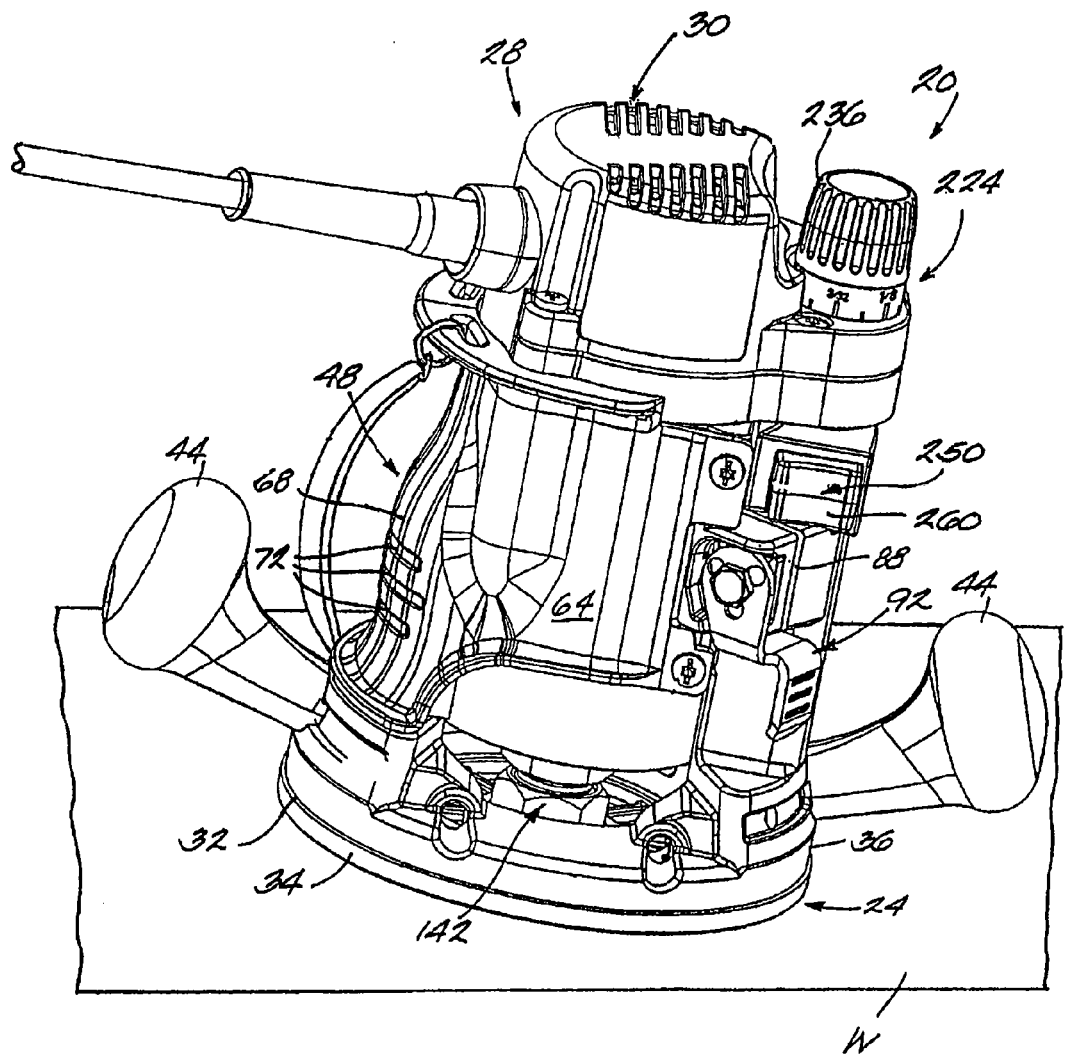
FIG. 1 is a perspective view of a power tool, such as a router embodying aspects of the invention.

Before at least one embodiment of the invention is explained in detail, it is to be understood that the invention is not limited in its application to the details of the construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION

Figure 10:
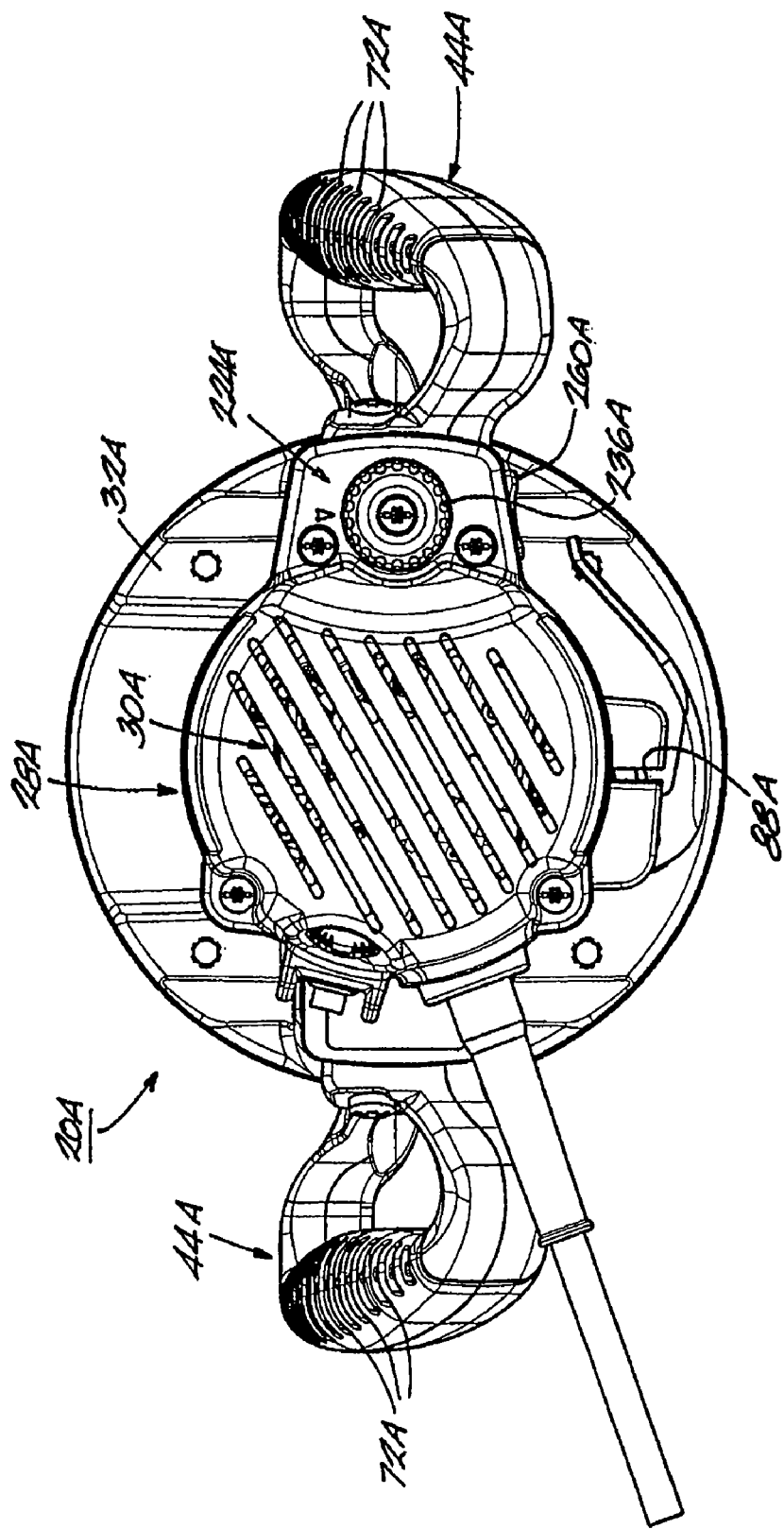
FIG. 10 is a top view of the router shown in FIG. 4.
Figure 11:
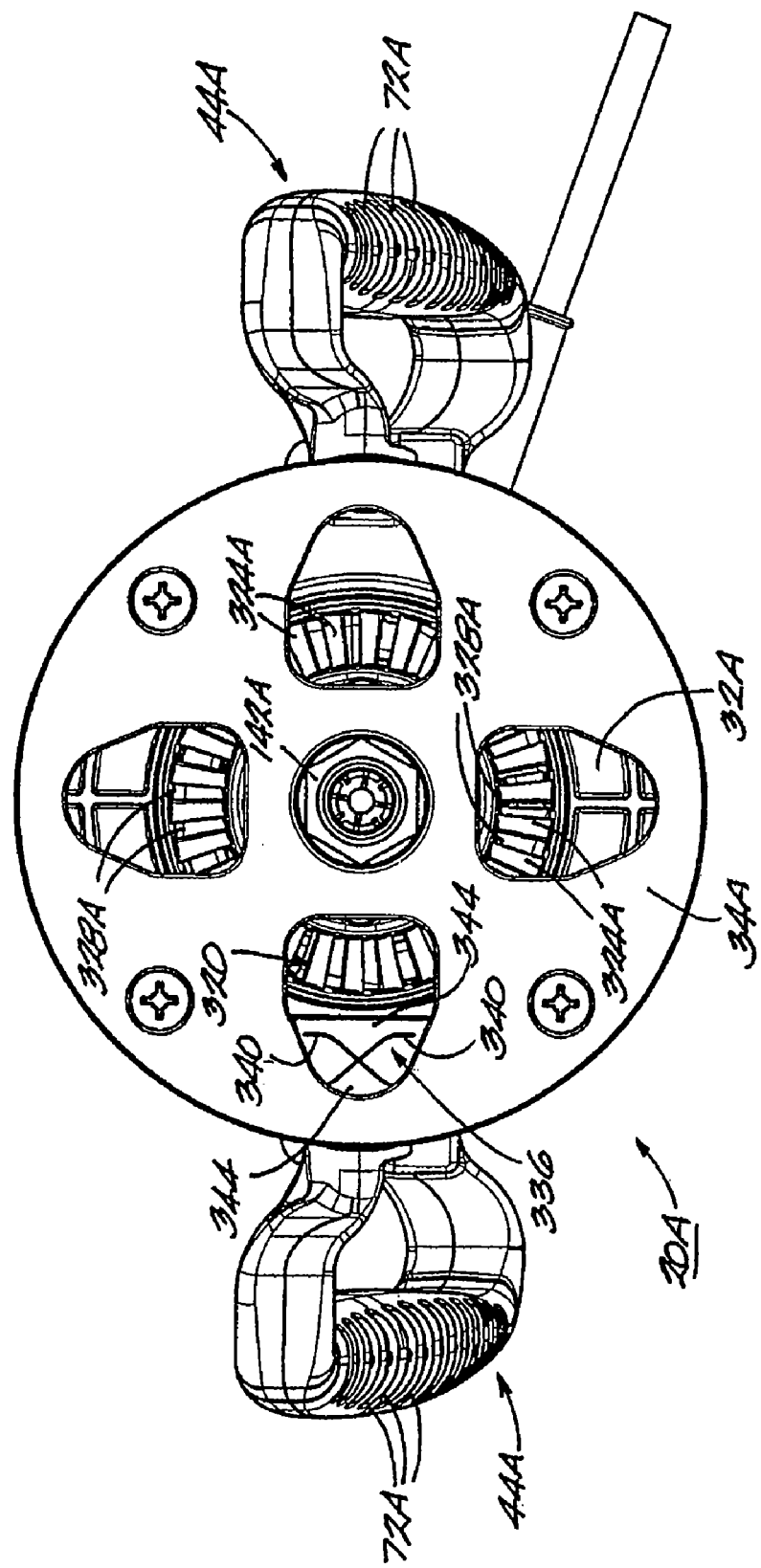
FIG. 11 is a bottom view of the router shown in FIG. 4.
Figure 53:
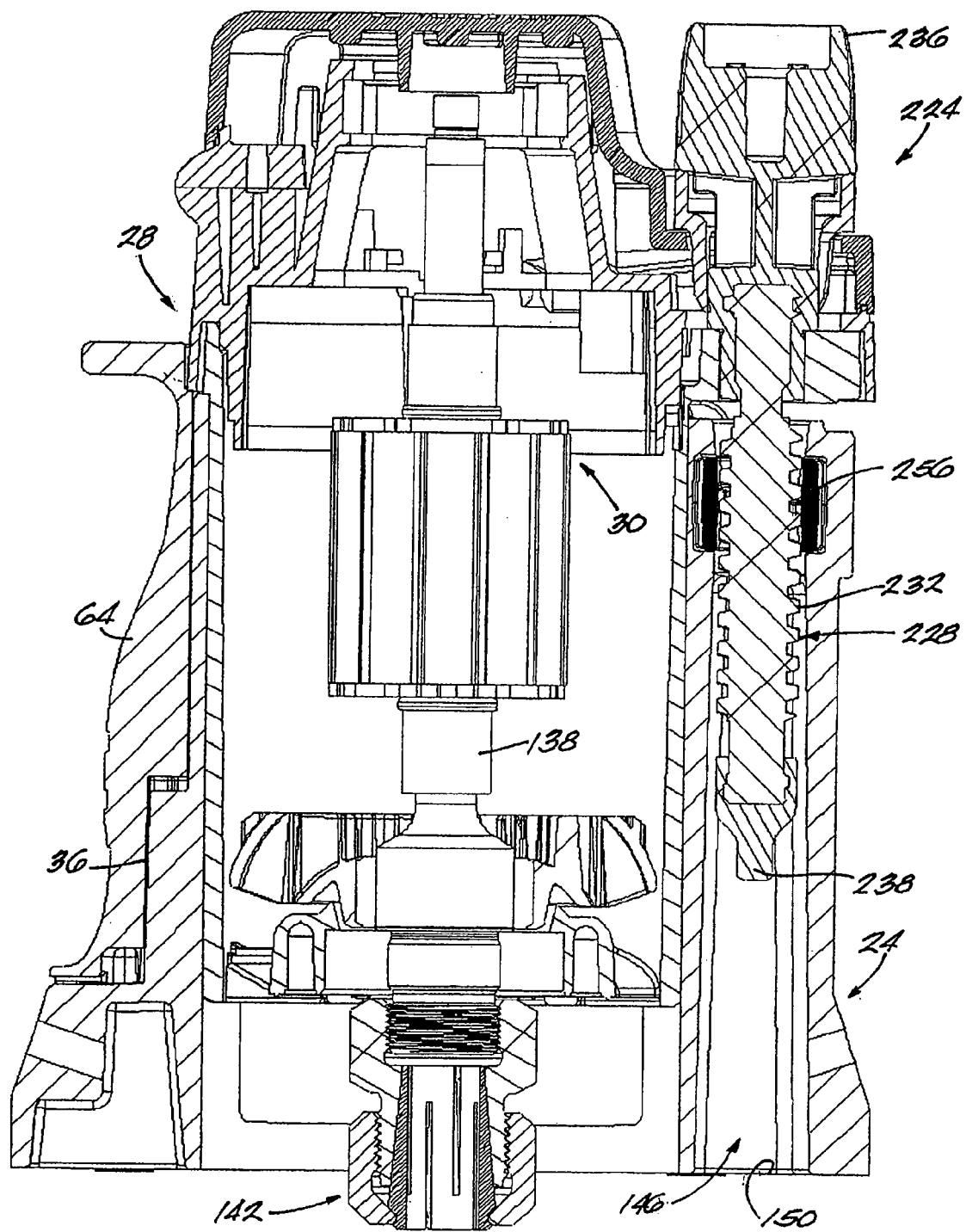
FIG. 53 is a cross-sectional view of the router shown in FIG. 1.

A power tool, such as a router 20 embodying aspects of the invention, is illustrated in FIG. 1. The router 20 includes a base 24 and a motor housing 28 movably supported by the base 24. The housing 28 supports (see FIGS. 10 and 53) a motor 30 operable to drive (see FIG. 2) a tool element 31 to cut (see FIG. 1) a workpiece W. In the illustrated construction, the router 20 is a fixed-base router. However, in other constructions (not shown) and for aspects of the invention, the router 20 may be a plunge router. In yet other constructions (not shown) and for aspects of the invention, the router 20 may be another type of power tool, which may be operated in an inverted position below a support member, such as, for example, a table, or which may have an opening through which debris or contaminants may enter.

As shown in FIG. 1, the base 24 includes a lower portion 32 on which a base plate 34 may be mounted. The base plate 34 is designed to provide a smooth interface with a work surface, such as the surface of the workpiece W. The base 24 also includes a generally cylindrical annular sleeve 36 extending upwardly from the lower portion 32.

In the illustrated construction, a pair of knob-like handles 44 is removably mountable on the base 24 on opposite sides of the sleeve 36. The handles 44 preferably include soft-grip material covering at least a portion of the handle 44 to provide extra friction for gripping.

The router 20 also includes a hand grip 48 attachable to the base 24 of the router 20. The outer surface 64 of the hand grip 48 is preferably contoured to ergonomically match the shape of an operator's hand engaging the hand grip 48 and, thus, gripping the router 20. At least a portion of the hand grip 48 may include a soft grip 68 preferably formed of an elastomeric or tactile material to increase gripping friction. The soft grip 68 may also reduce the amount of vibration and/or heat passed from the router 20 to an operator. The hand grip 48 may also include a plurality of ribs, ridges, or slots 72 to increase gripping friction.

The sleeve 36 of the base 24 is somewhat resilient and (see FIGS. 2-3) is open on one side at a vertical seam 88. As a result, the inner diameter of the sleeve 36 may be increased or decreased by opening or closing, respectively, the seam 88.

The resilience of the sleeve 36 results in the seam 88 being partially open when no force is applied to close the seam 88.

Figure 3:
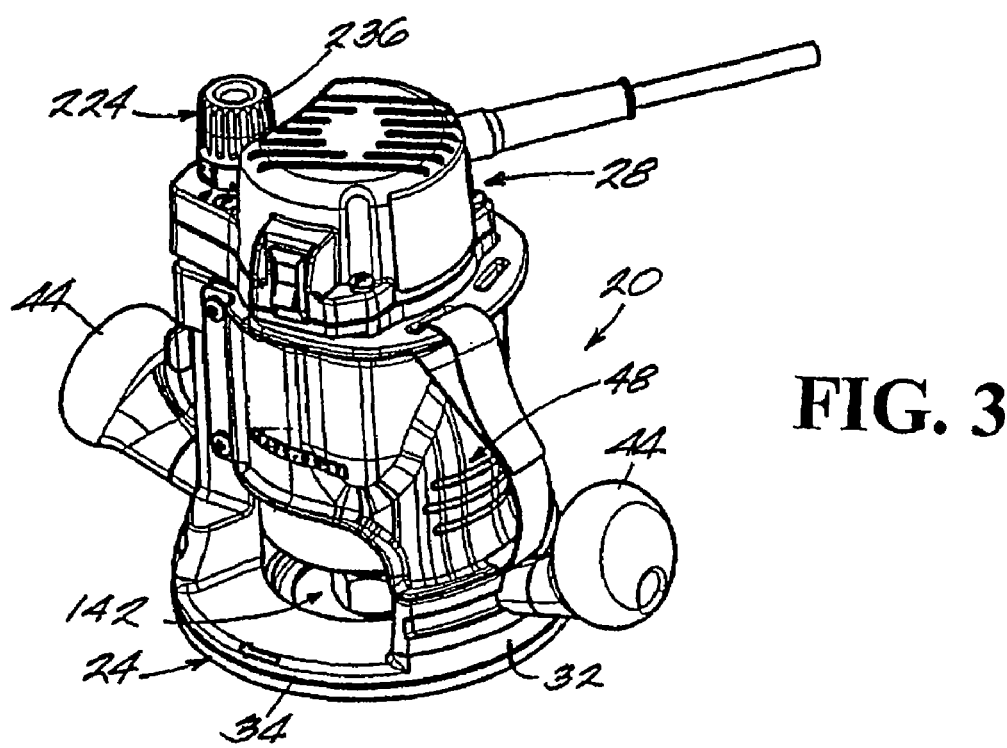
FIG. 3 is a perspective view of the router shown in FIG. 1.

As shown in FIGS. 1 and 3, the router 20 is a fixed-base router and also includes a clamp mechanism 92 to control the opening and closing of the seam 88. When the seam 88 is generally closed, the base 24 is in a clamped position, in which the position of the housing 28 relative to the base 24 is fixed. When the seam 88 is open, the base 24 is in a released position, in which the housing 28 is movable relative to the base 24.

As shown in FIG. 1, the housing 28 is generally vertically oriented and has a generally cylindrical outer surface. The housing 28 supports the motor 30 and associated components. The motor 30 includes a shaft 138 (see FIG. 53), and a tool holder, such as a collet 142, connected to or formed with the shaft 138. The tool element 31 is supported by the collet 142.

The housing 28 is arranged to fit within the sleeve 36 and to be vertically movable relative to the sleeve 36. Closing the seam 88 using the clamp mechanism 92, as described above, causes the inner surface of the sleeve 36 to engage the outer surface of the housing 28 and to restrict the vertical movement of the housing 28. Opening the seam 88 releases the housing 28 and allows the housing 28 to be moved vertically.

As shown in FIGS. 2, 33-36, 44-48 and 52-53, the base 24 defines a depth adjustment column 146 adjacent the clamp mechanism 92 and is preferably formed integrally with the sleeve 36. The depth adjustment column 146 is generally hollow and has (see FIGS. 44-45, 48 and 52) an open top end 148 and (see FIGS. 46-47 and 52-53) an open bottom end 150. In some aspects, the router 20 also includes a depth adjustment mechanism 224 which cooperates with the housing 28 and the base 24 to control the vertical position of the housing 28 relative to the base 24 and to thereby control the depth of cut of the tool element 31.

As shown in FIGS. 2, 6-8, 10, 20-23 and 48-53, the depth adjustment mechanism 224 includes a depth adjustment shaft 228 which is generally vertically oriented and which has a threaded portion 232 generally housed within the depth adjustment column 146. An adjustment knob 236 is attached to an upper end of the depth adjustment shaft 228. The lower end 238 has a non-circular cross-section, the reason for which is explained below in more detail. The depth adjustment shaft 228 is vertically fixed, but rotatable relative to the housing 28 and moves vertically with the housing 28 relative to the base 24.

As shown in FIGS. 1-3, 5, 7 and 44-53, the depth adjustment mechanism 224 also includes a lock mechanism 250. The depth adjustment mechanism 224 may be used to adjust the vertical position of the housing 28 relative to the base 24 in two modes. For coarse adjustment, a lock button 260 of a lock frame 256 is pushed inward against a biasing member 278, releasing the threaded portion 232 from engagement with a locking projection 276 of the lock frame 256 (see FIGS. 44-53). The depth adjustment shaft 228 and the housing 28 are then free for course movement in a vertical direction relative to the base 24. Once the desired vertical position of the depth adjustment shaft 228 and the housing 28 is achieved, the lock button 260 is released and the biasing member 278 again biases the lock frame 256 outward to the thread-engaging position and the locking projection 276 engages the threaded portion 232. Once the locking projection 276 is re-engaged with the depth adjustment shaft 228, the depth adjustment shaft 228 and the housing 28 are restricted from free translational movement.

For fine adjustment, the lock mechanism 250 remains engaged with the depth adjustment shaft 228. The adjustment knob 236 is rotated, thus rotating the depth adjustment shaft 228 and the threaded portion 232. The threaded portion 232 rotates relative to the locking projection 276 so that the depth adjustment shaft 228 and the housing 28 move in relatively small increments in a vertical direction relative to the lock frame 256 and the base 24.

Figure 2:
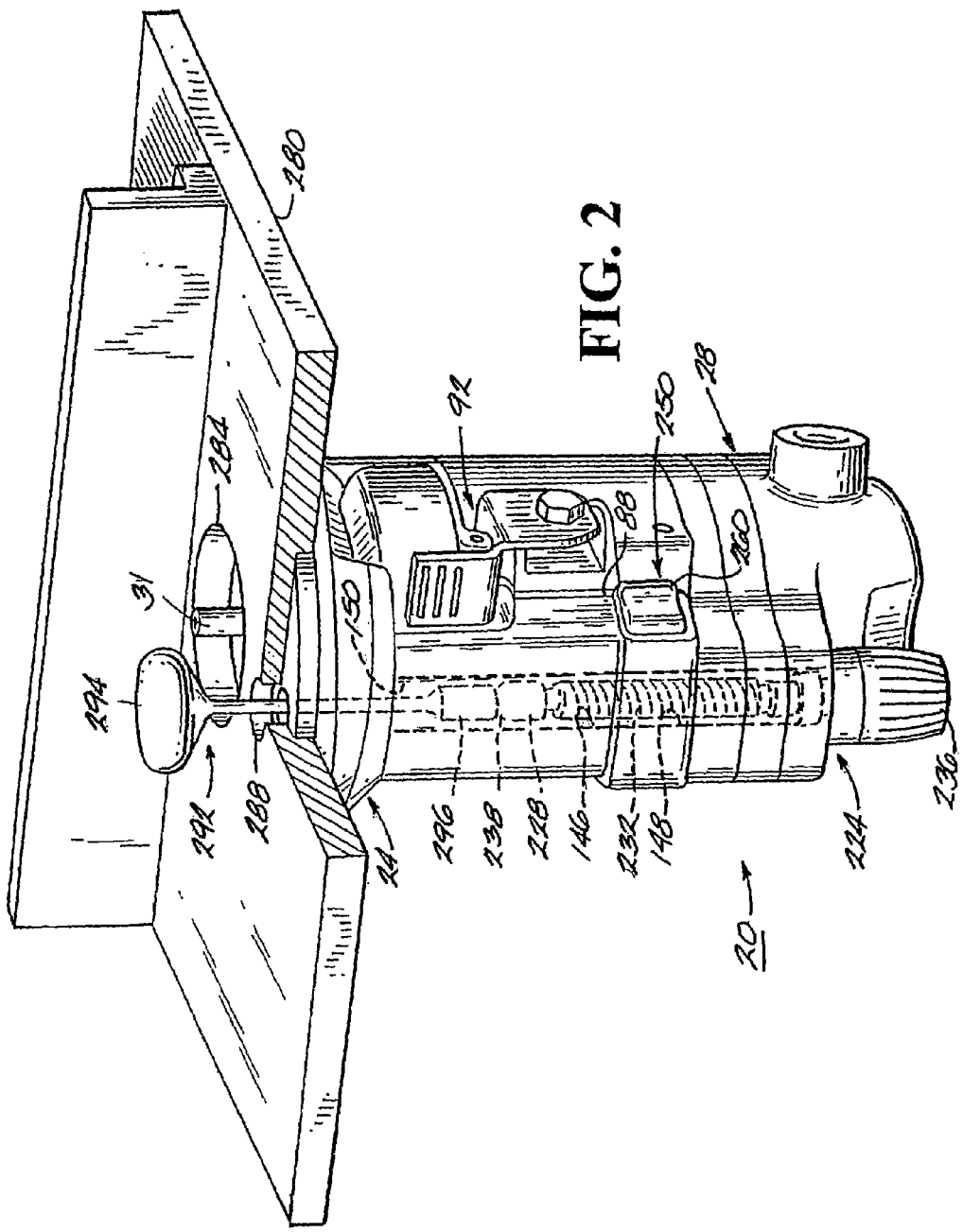
FIG. 2 is a perspective view of a router shown in an inverted position.

As shown in FIG. 2, the router 20 can be supported in an inverted position below a support member, such as, for example, a table 280. The table 280 has an upper surface for supporting a workpiece W and a lower surface to which the router 20 is connected. First and second apertures or openings 284 and 288 extend through the table 20. The first aperture 284 allows a tool element or cutting bit 31 of the router 20 to protrude above the table 280 so work can be done on the workpiece.

An adjustment member 292 is inserted into the second aperture 288 of the table 280 to facilitate adjustment of the cutting depth of the router 20 from above the table 280. The adjustment member 292 has a knob 294 engageable by an operator and a second end 296 engageable with the lower end 238 of the depth adjustment shaft 228. The ends 296 and 238 have complementary engaging surfaces to rotatably connect the adjustment member 292 and the depth adjustment shaft 228. As the adjustment member 292 is rotated, the depth adjustment shaft 228 rotates, thereby adjusting the height of the tool element or cutting bit 31 above the table 280. The adjustment member 292 alleviates the need to reach under the table and rotate the adjustment knob 236 of the height adjustment mechanism 224 to make fine height adjustments to the depth of cut of the router 20.

Components of the router 20, such as, for example, the hand grip 48, the clamp mechanism 92 and the depth adjustment mechanism 224 are similar to that disclosed in co-pending, jointly-owned U.S. patent application Ser. No. 09/927,448, filed Aug. 11, 2001, which is hereby incorporated by reference.

An alternative construction of a power tool, such as a router 20A embodying aspects of the invention, is illustrated in FIGS. 4-11 and 32-47. Common elements of the router 20A are identified by the same reference number "A".

The router 20A includes one or more generally D-shaped handles 44A which, in the illustrated construction, are attached to the base 24A. In the illustrated construction, the handle(s) 44A include a central grip portion for gripping by the operator. A first or upper connecting portion connects the upper end of the grip portion to the base 24A, and a second or lower connecting portion connects the lower end of the grip portion to the base 24A.

Figure 8:
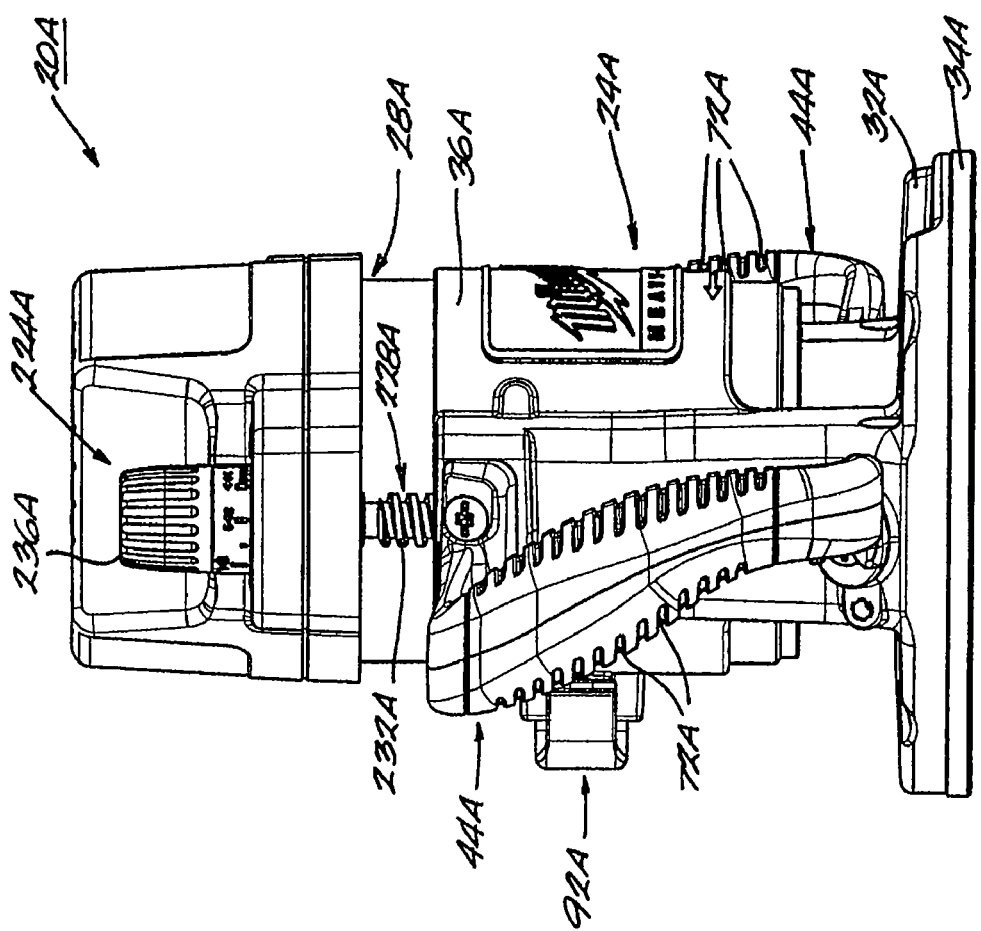
FIG. 8 is a left side view of the router shown in FIG. 4.
Figure 9:
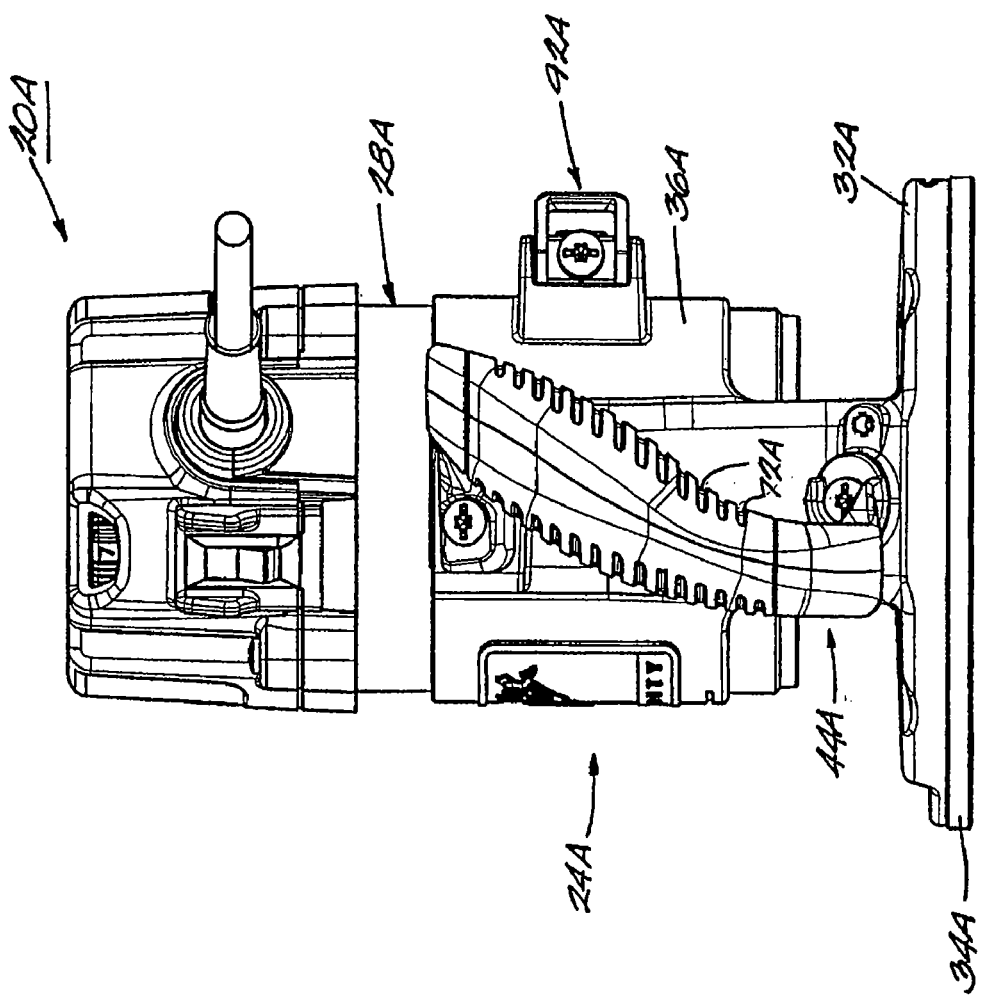
FIG. 9 is a right side view of the router shown in FIG. 4.

In some aspects and in the illustrated construction, at least one handle 44A (and, preferably, both handles 44A) is angled relative to the vertical (as viewed from the side of the router 20A as shown in FIGS. 8-9). In some aspects and in the illustrated construction, at least one handle 44A (and, preferably, both handles 44A) is curved to provide comfortable gripping and control of the router 20A during cutting operations. In some aspects and in the illustrated construction, at least one handle 44A (and, preferably, both handle(s) 44A) extends along a generally serpentine curve (see FIGS. 8-9). Preferably, the handles 44A are contoured ergonomically to generally match the shape of an operator's hand engaging each handle 44A.

The handles 44A may be formed at least partially of an elastomeric or tactile material to provide improved gripping and comfort (including, for example, vibration and heat absorption). The handles 44A may include ribs, ridges or slots 72A to also improve gripping and comfort.

In other constructions, the router 20A can include only a single handle 44A. In yet other constructions, one or more of the handles 44A can be replaced with knob-like handles 44. In such constructions, the router 20A can include at least one of each handle 44A and 44 or can include only handles 44.

Figure 12:
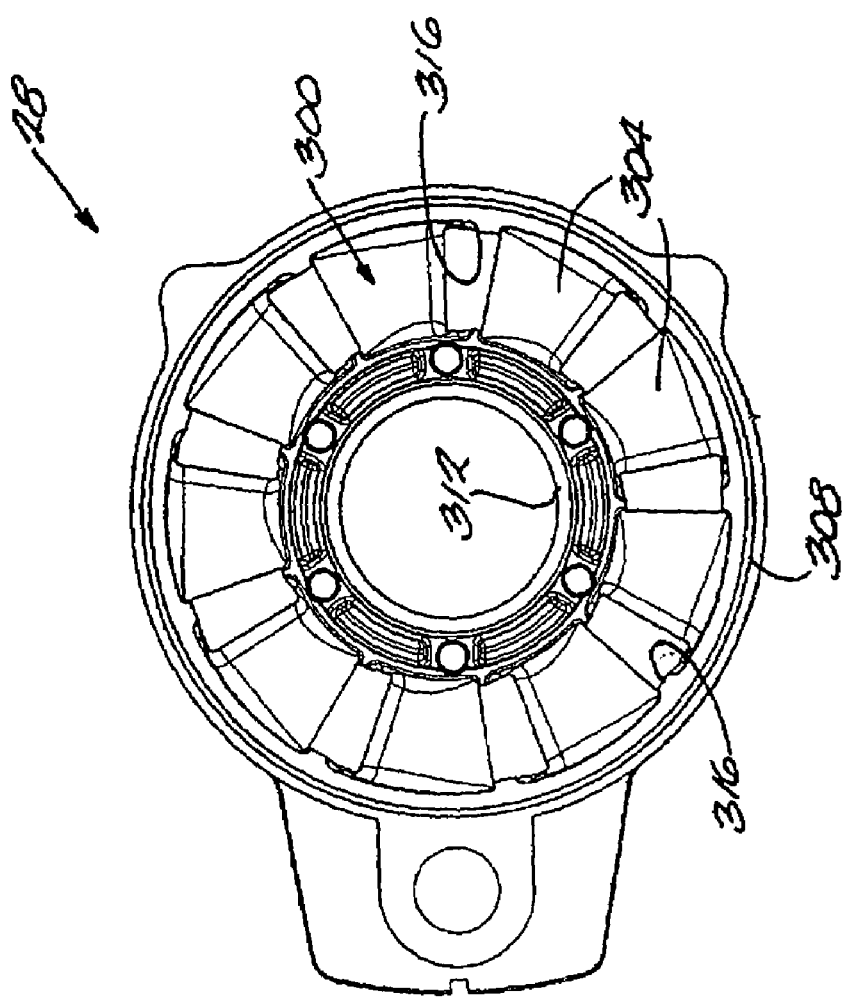
FIG. 12 is a bottom view of a motor housing.
Figure 16:
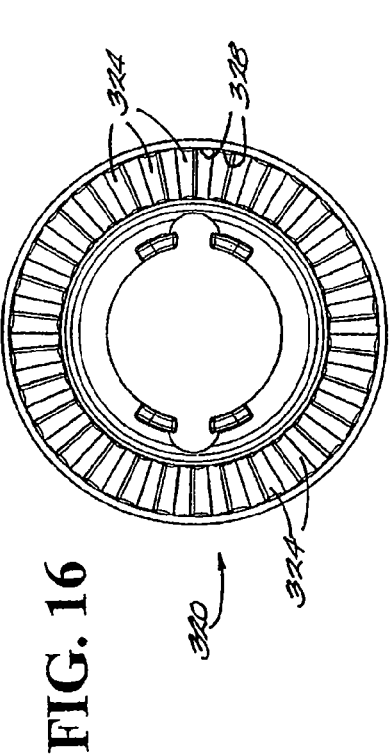
FIG. 16 is a top view of the contamination shield.
Figure 15:
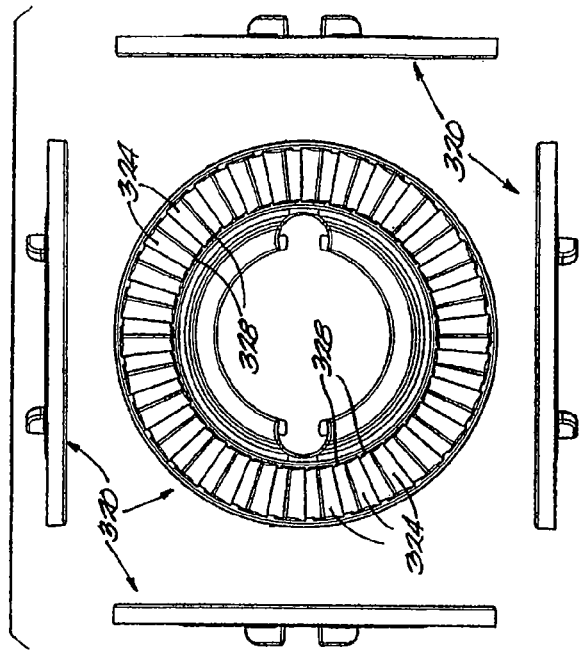
FIG. 15 are views of the contamination shield.
Figure 14:
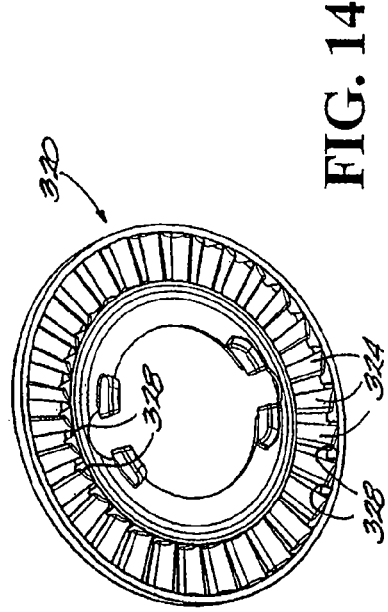
FIG. 14 is a top perspective view of the contamination shield.
Figure 13:
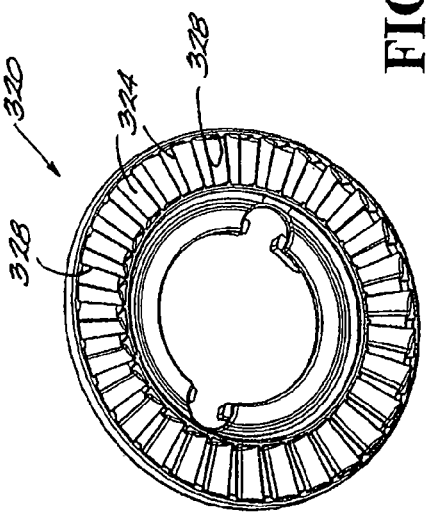
FIG. 13 is a bottom perspective view of a contamination shield.
Figure 17:
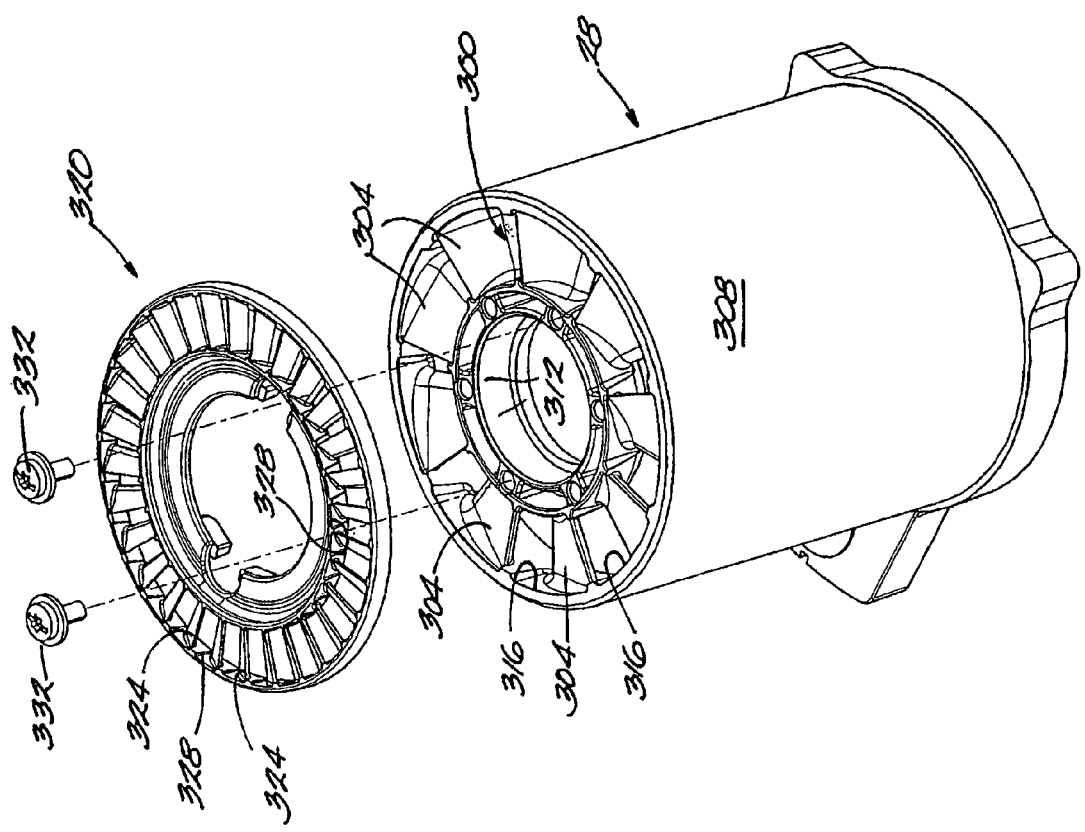
FIG. 17 is an exploded view of the motor housing and the contamination shield.
Figure 18:
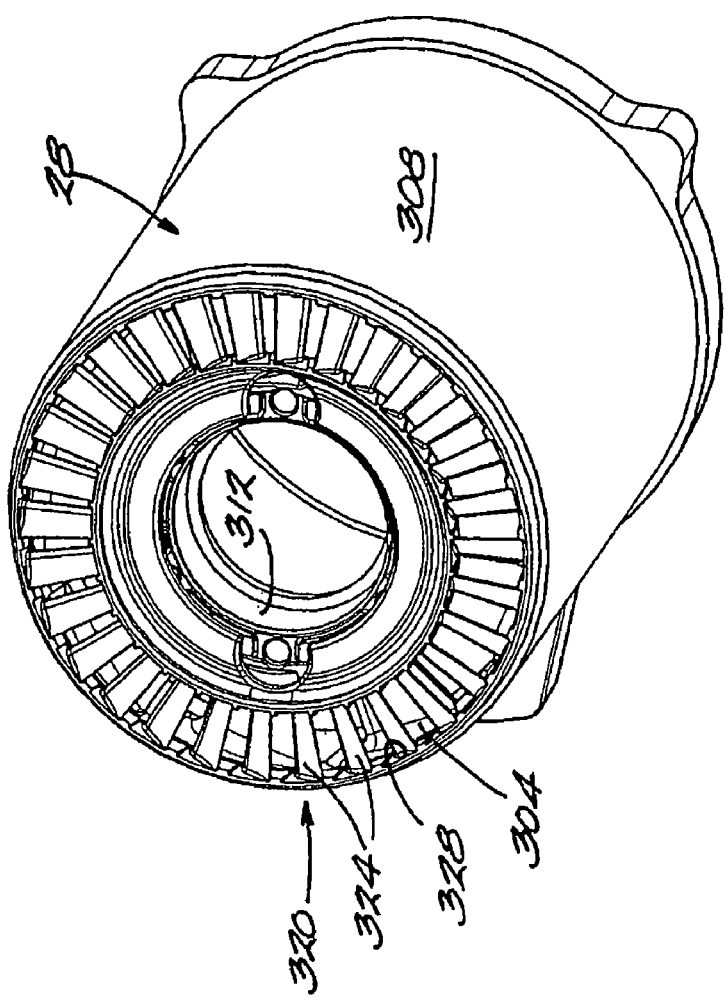
FIG. 18 is a bottom perspective view illustrating the contamination shield supported on the motor housing.
Figure 19:
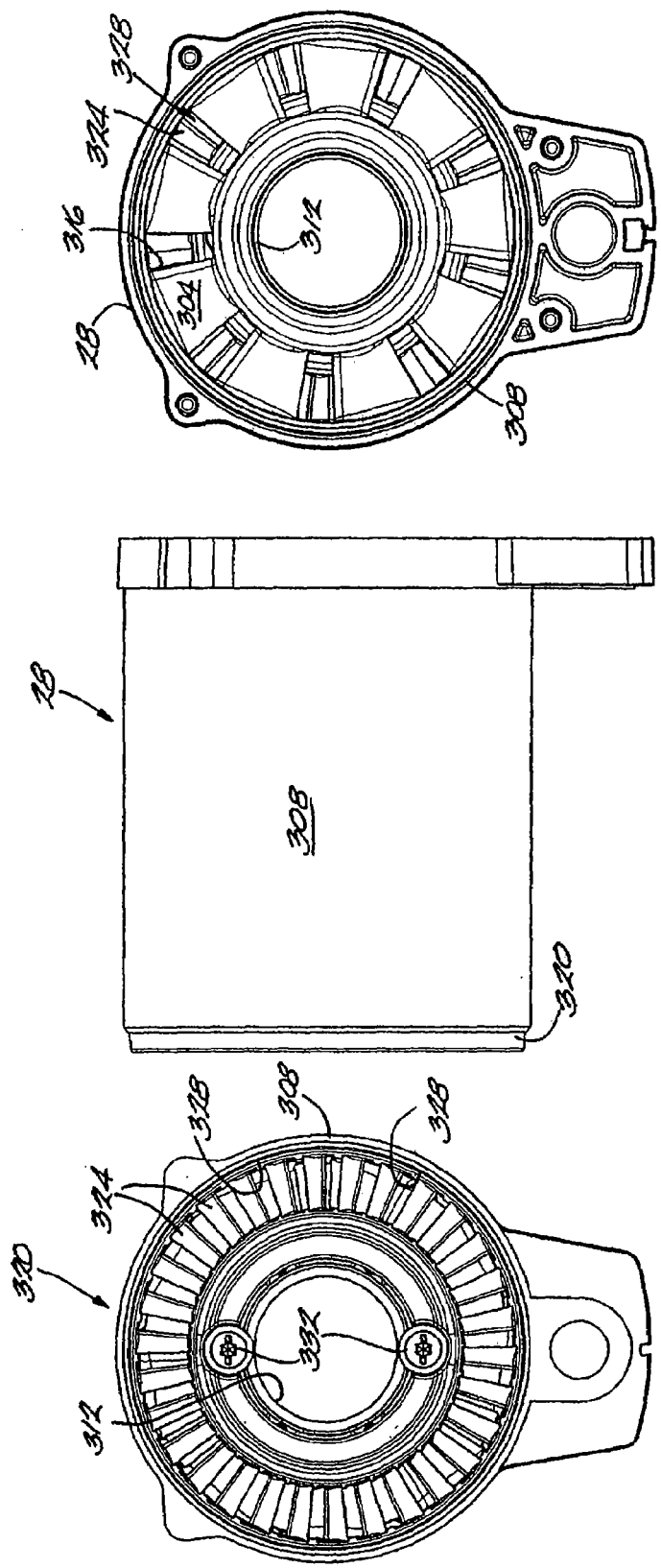
FIG. 19 are views of the motor housing with the contamination shield supported on the motor housing.
Figure 20:
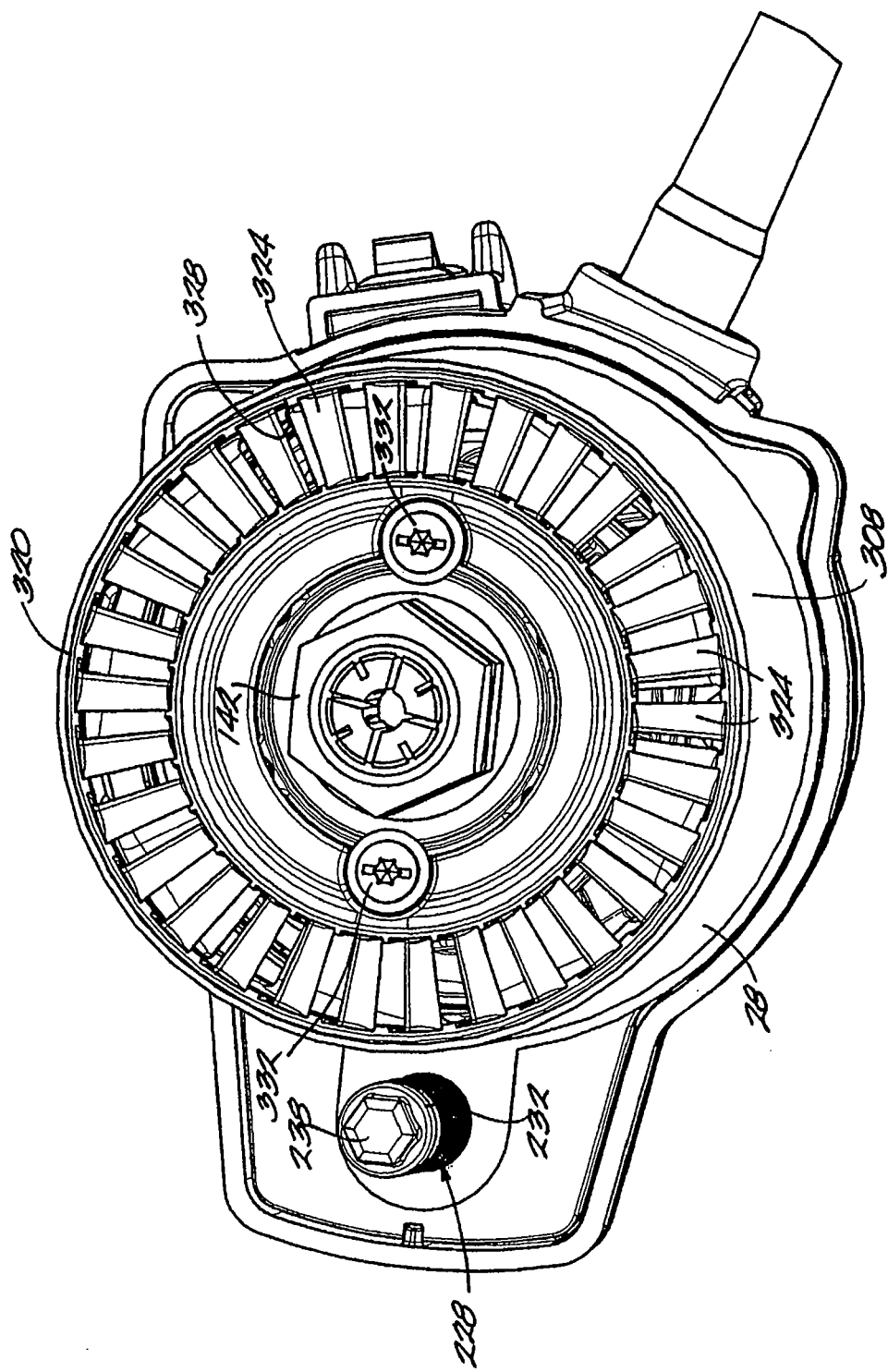
FIGS. 20-23 are bottom perspective views of the motor housing with the contamination shield supported on the motor housing.
Figure 21:
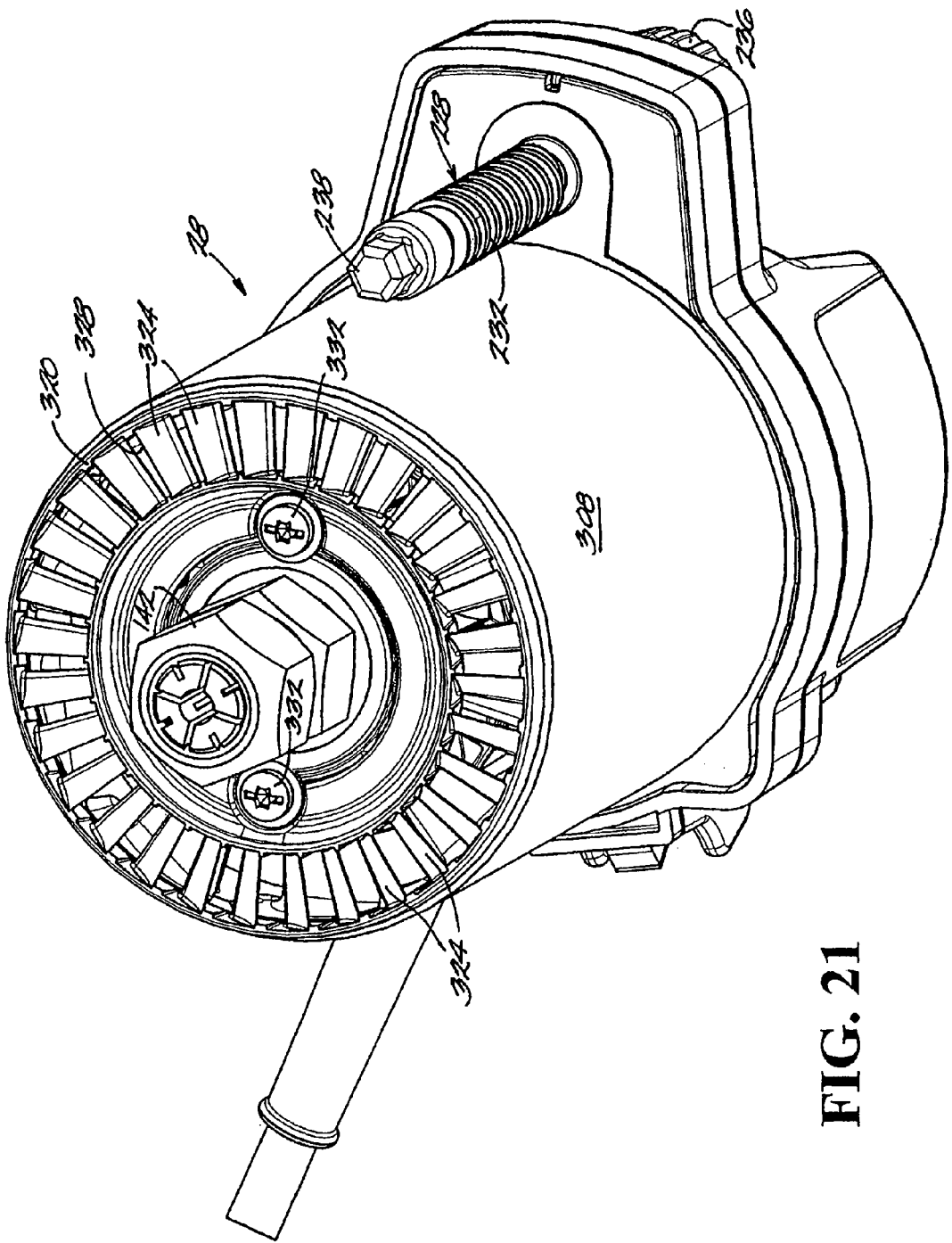
Figure 23:
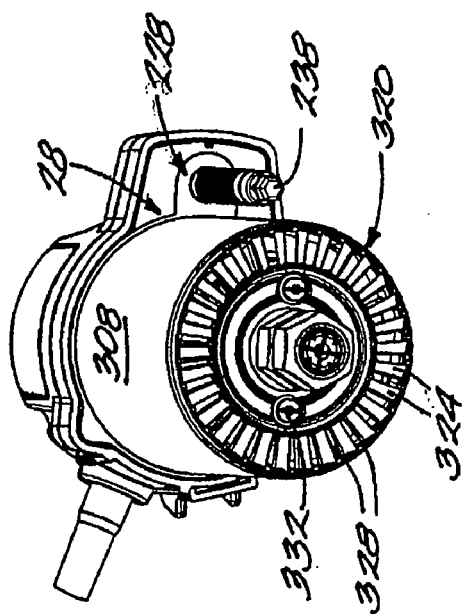
Figure 22:
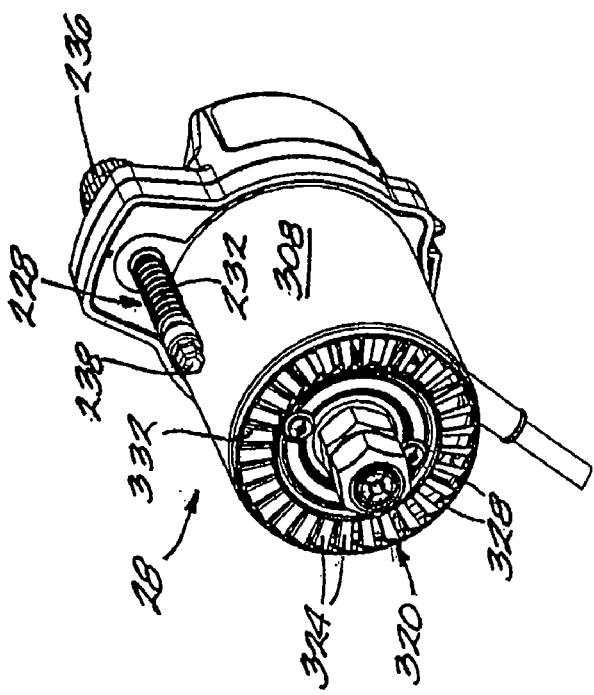
Figure 24:
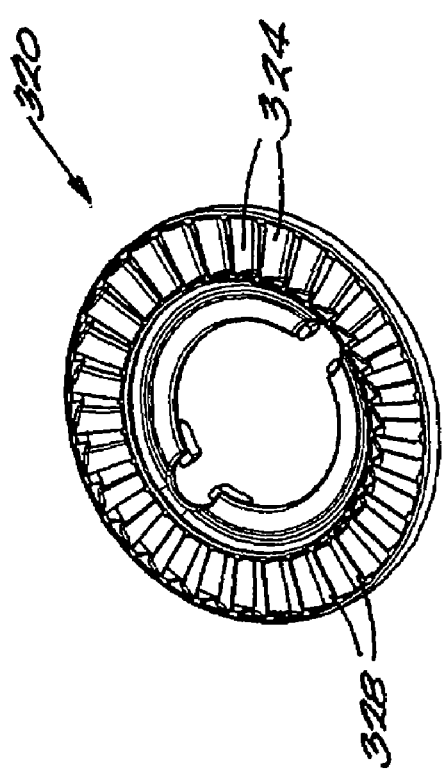
FIG. 24 is a bottom perspective view of the contamination shield.

As shown in FIGS. 12 and 17, the housing 28 provides an air flow outlet 300. The outlet 300 is formed by fins or housing blades 304 extending from a wall 308 of the body of the housing 28 to a bearing support 312 (in which a bearing (not shown) supports the motor shaft). The blades 304 are spaced apart to provide air flow outlet openings 316.

Preferably, the blades 304 are angled to produce the desired "swirling" effect on the air flow and on debris produced during cutting operations. The "swirling" air flow assists in removing debris, such as saw dust, from the base 24 in a controlled manner, rather than "blasting" the air and sending debris all over the place. In the illustrated construction, the blades 304 are angled between approximately 15° and 45° from the horizontal.

In the illustrated construction, the housing 28 is formed as an aluminum die-casting. In other constructions, the housing 28 may be formed of a different material, such as magnesium, steel, plastic, etc. Die-casting typically requires a blade thickness of 0.09 to 0.125 inches.

To accommodate the die-casting process, to provide the necessary support for the bearing and the motor shaft 138 (about 0.125 inches is required for strength), and to provide the necessary air flow, the size and spacing of the blades 304 is optimized. In the illustrated construction, the blades 304 are about 0.12 inches thick and are spaced apart to provide openings 316 of about 0.30 inches.

Because the openings 316 are relatively large, debris or other contaminants may intrude through the openings 316 into the housing 28 and affect operation of the motor 30 and other components. The potential for contamination increases when the router 20 or 20A is used in the inverted position (shown in FIGS. 2, 26-27 and 32).

In some aspects of the invention, a contamination shield 320 (see FIGS. 13-24) is provided to reduce the potential for contamination or to inhibit movement of debris into the housing 28 (by reducing the size of the openings into the housing 28) while still maintaining the desired air flow (amount and direction). The shield 320 is preferably molded of a material, such as, for example, nylon or another plastic, to provide reduced-thickness (relative to the blades 304) shield blades 324. The shield blades 324 are relatively closely spaced to provide reduced-sized (relative to the openings 316 in the housing 28) shield openings 328. In the illustrated construction, the shield blades 324 have a thickness of about 0.05 inches (less than half the thickness of the blades 304) and are spaced apart to provide shield openings 328 of about 0.15 inches (half the size of the openings 316). The blades 304 and the shield blades 324 may be positioned and cooperate to provide even smaller openings into the housing 28.

As shown in FIGS. 17 and 19-23, the shield 320 is removably connected to the housing 28 by fasteners 332 to provide easy installation, removal and replacement. For example, an operator may only desire to use the shield 320 when the router 20 or 20A is supported and operated in the inverted position. The shield 320 may be removed and stored during normal, upright operations and only installed prior to inverted operation. Also, a contamination shield (not shown) having a different configuration (i.e., to provide a different size shield blade and/or shield opening or to provide a different air flow) may be substituted for the shield 320.

It should be understood that the shield 320 may be used with the router 20 or 20A or with other routers (not shown).

It should be understood that, in accordance with aspects of the invention, the shield 320 may be used with other power tools which may be used in an inverted position or which may have an opening through which debris or contaminants may enter the motor housing or other housing portion of the power tool. In addition, in accordance with aspects of the invention, a removable contamination shield (not shown) may be designed for use with other power tools to cover air flow openings (inlet and/or outlet) or other openings formed in a housing of the power tool.

Figure 3A:
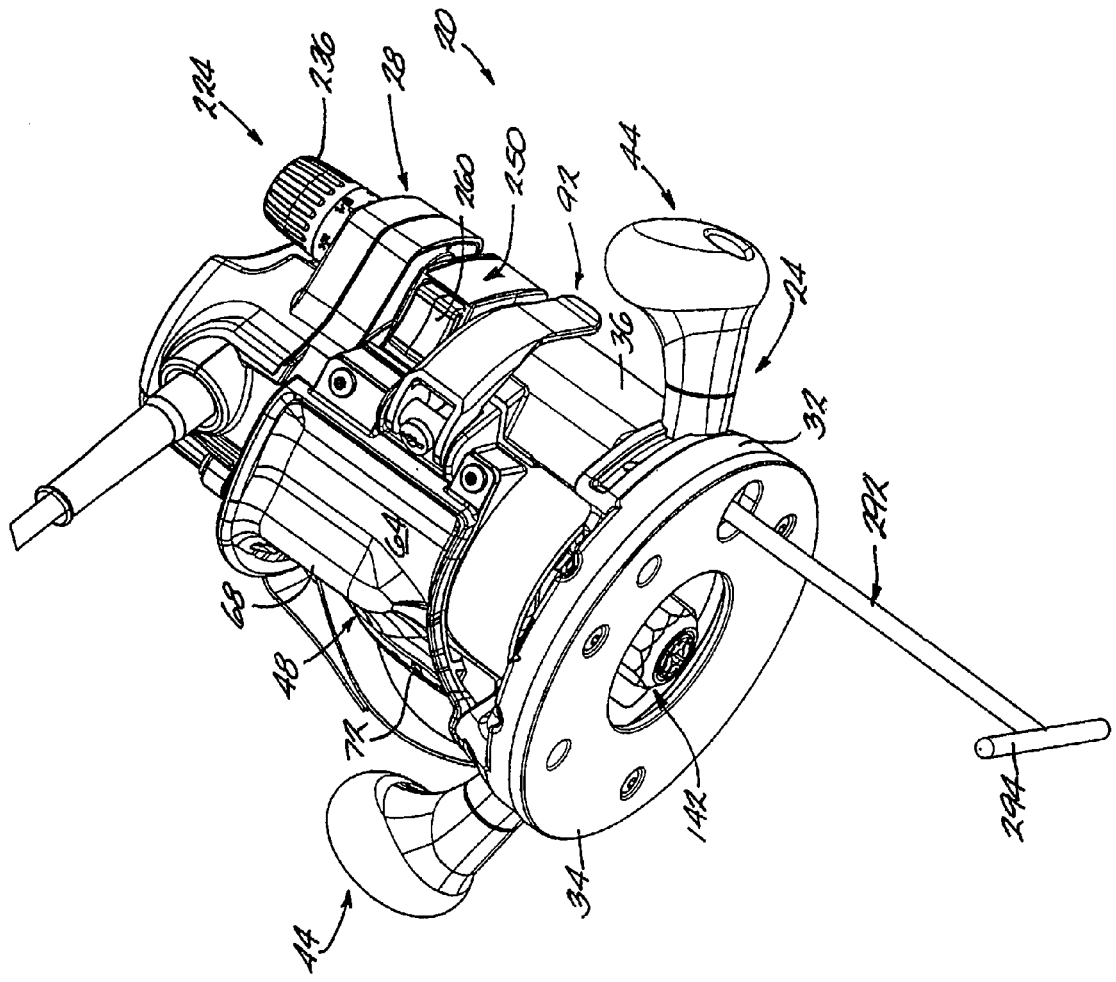
FIG. 3A is a bottom perspective view of the router shown in FIG. 1.
Figure 4:
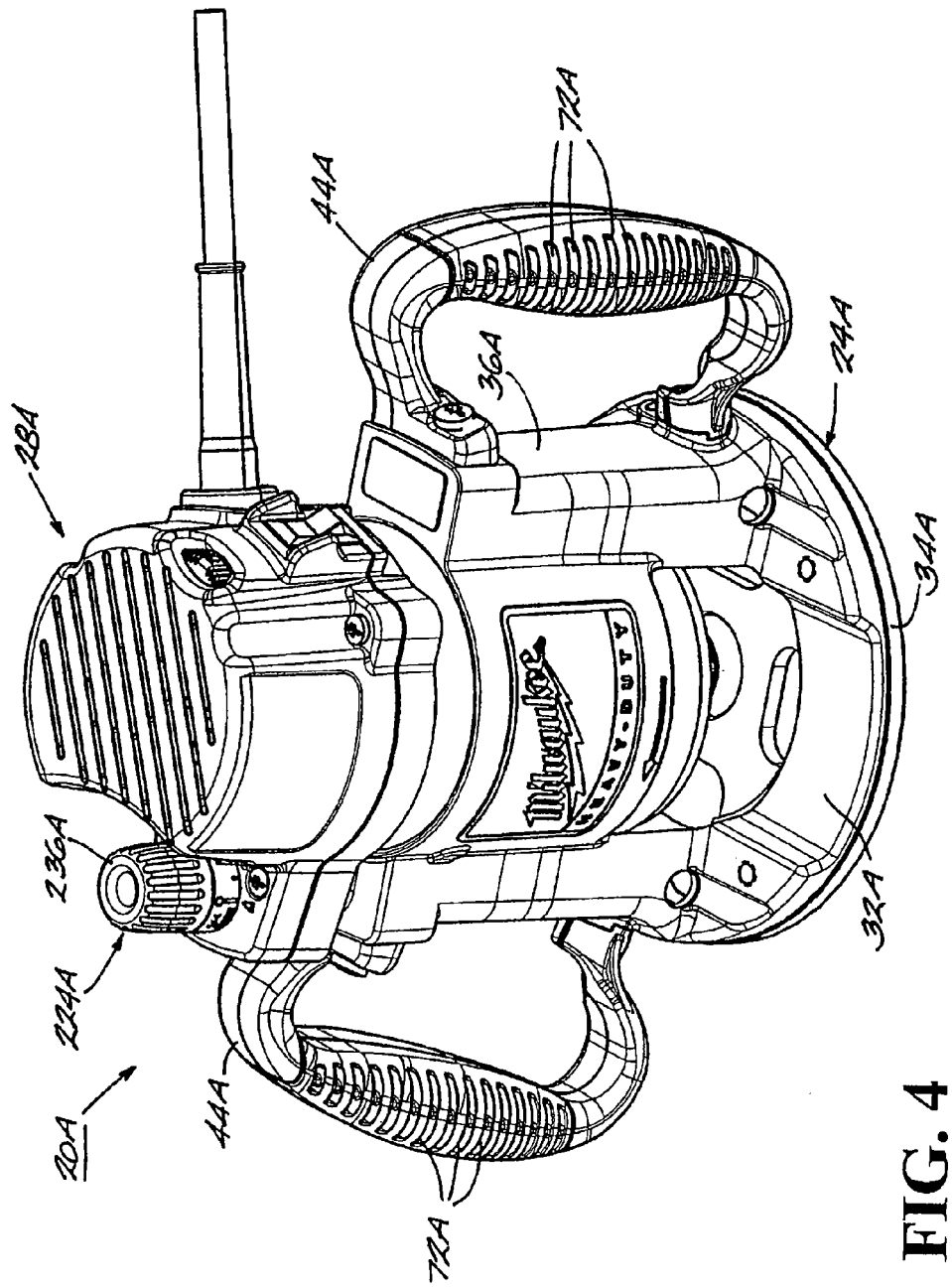
FIG. 4 is a perspective view of a second construction of a power tool, such as a router embodying aspects of the invention.
Figure 5:
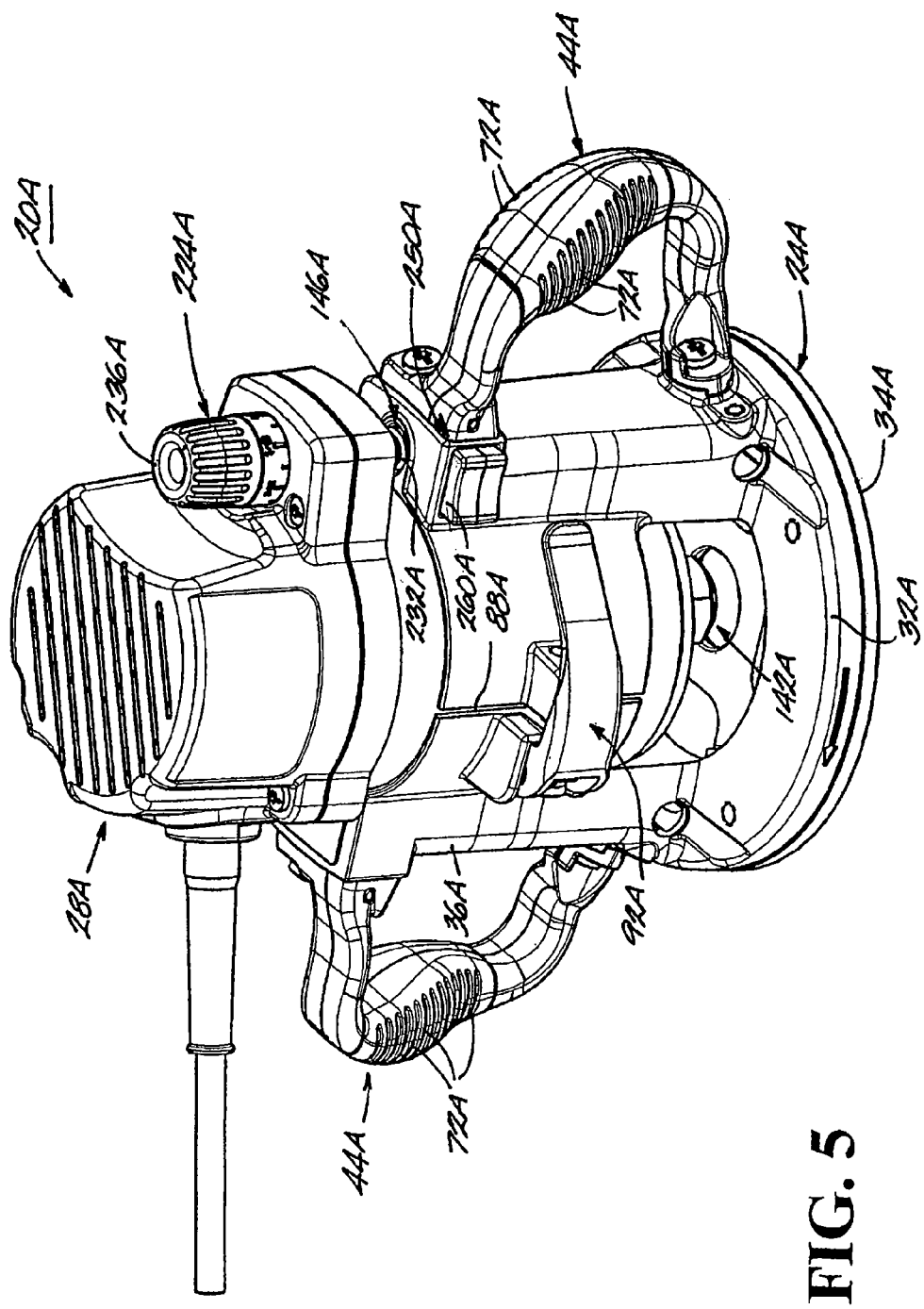
FIG. 5 is a rear perspective view of the router shown in FIG. 4.
Figure 6:
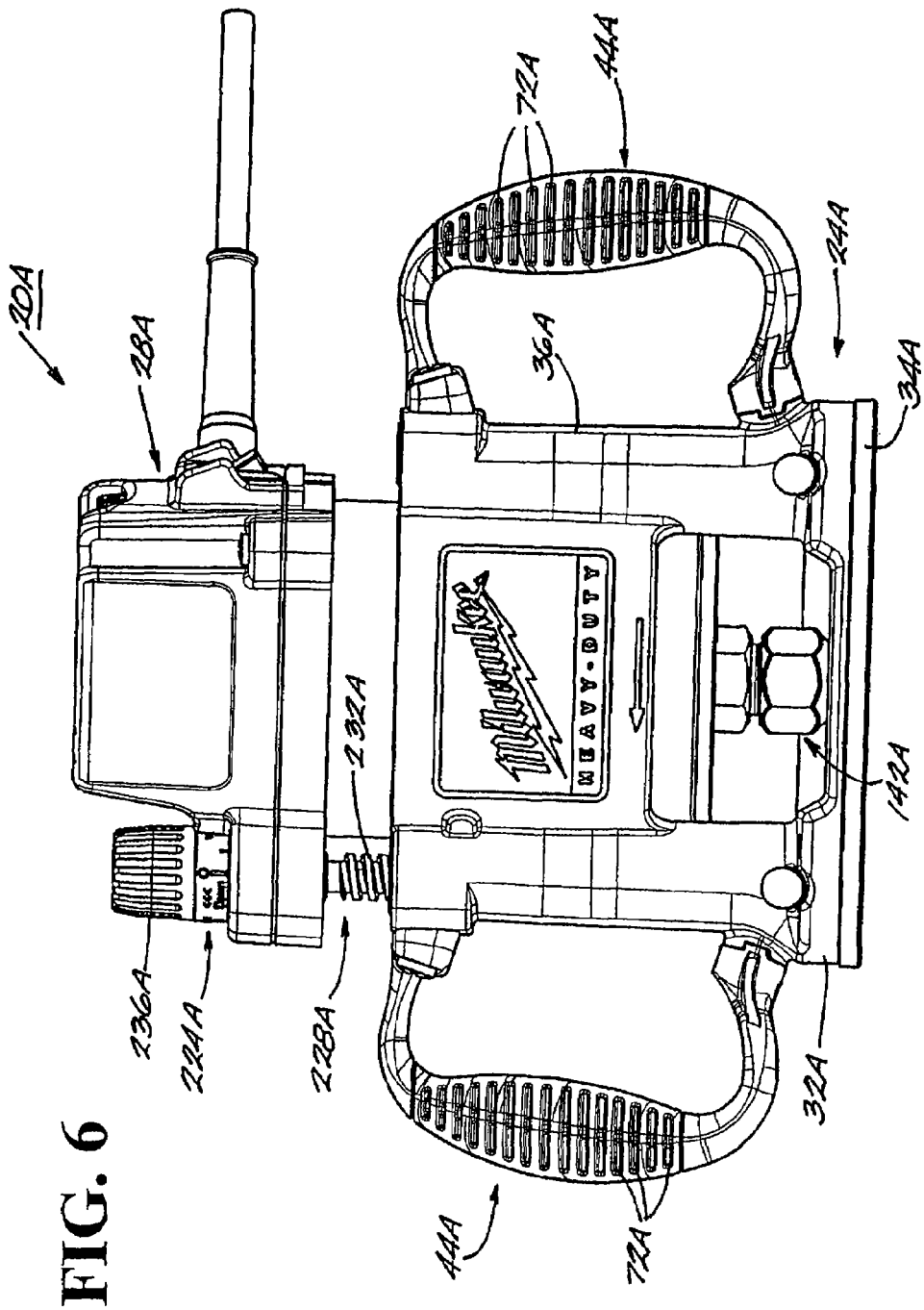
FIG. 6 is a front view of the router shown in FIG. 4.
Figure 7:
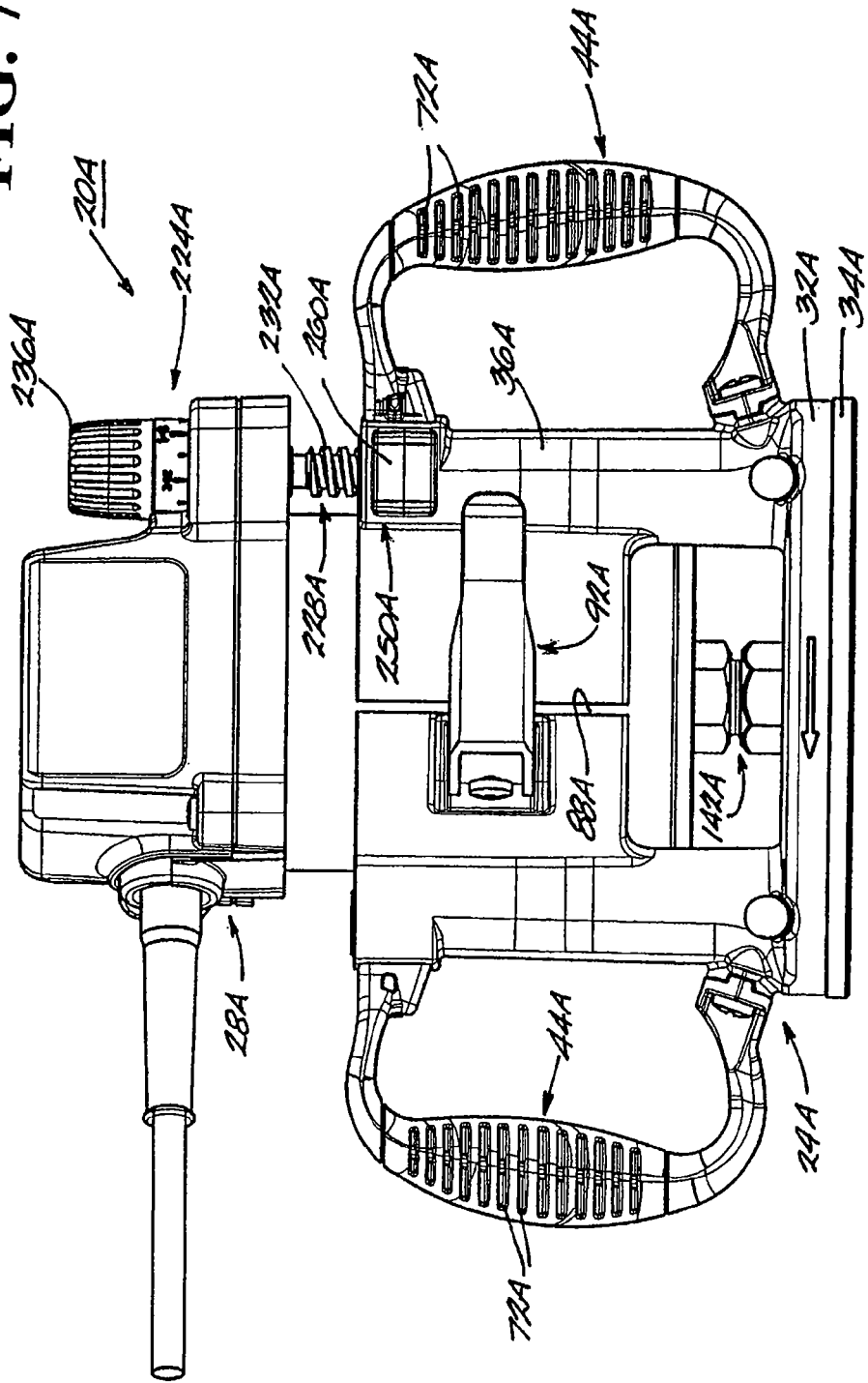
FIG. 7 is a rear view of the router shown in FIG. 4.

As discussed above with reference to FIGS. 2 and 3A, to facilitate adjustment of the cutting depth of the router 20 from above the table 280 when the router 20, 20A is in the inverted position, the adjustment member 292 may be inserted into the second aperture 288 of the table 280 and into the open bottom end 150 of the depth adjustment column 146 to engage the lower end 238 of the depth adjustment shaft 228. When the adjustment member 292 is not inserted into the depth adjustment column 146 (such as, for example, in the inverted position after adjustment of the depth and during cutting operations or during cutting operations in the normal, upright position), debris may enter the depth adjustment column 146 and potentially interfere with operation of the depth adjustment mechanism 224 or with future engagement of the adjustment member 292 and the lower end 238 of the depth adjustment shaft 228.

To inhibit entry of debris into the depth adjustment column 146, in some aspects of the invention, a debris shield 336 (see FIGS. 25-32) is provided to selectively close the open bottom end 150 of the depth adjustment column 146. The shield 336 is preferably removably secured between the lower portion 32 of the base 24 and the base plate 34 to provide for easy installation, removal and replacement. The shield 336 is preferably formed of a resilient, flexible material having perforations 340 to provide movable portions 344.

Figure 25:
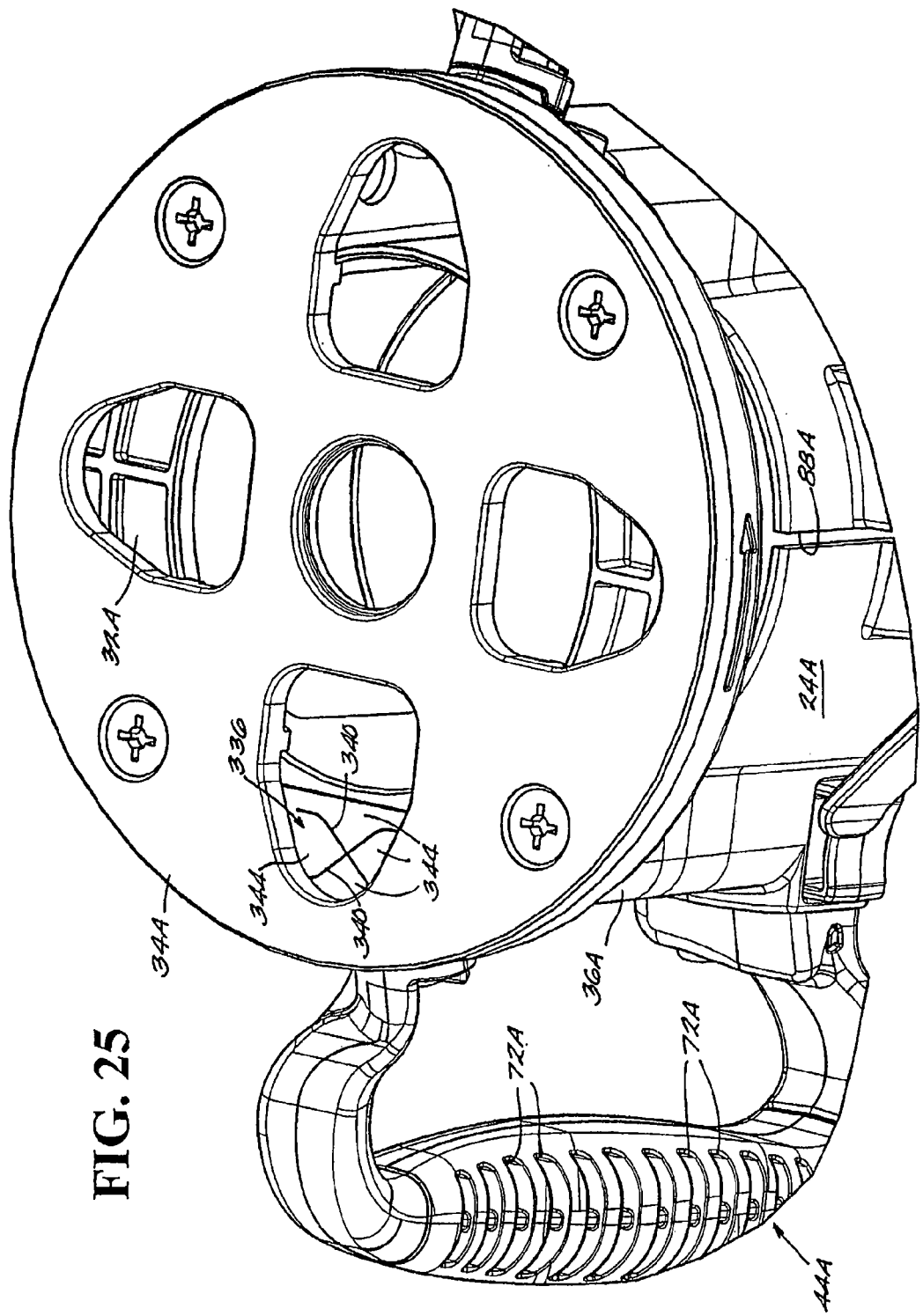
FIG. 25 is a bottom perspective view of a router base and illustrating a debris shield.
Figure 26:
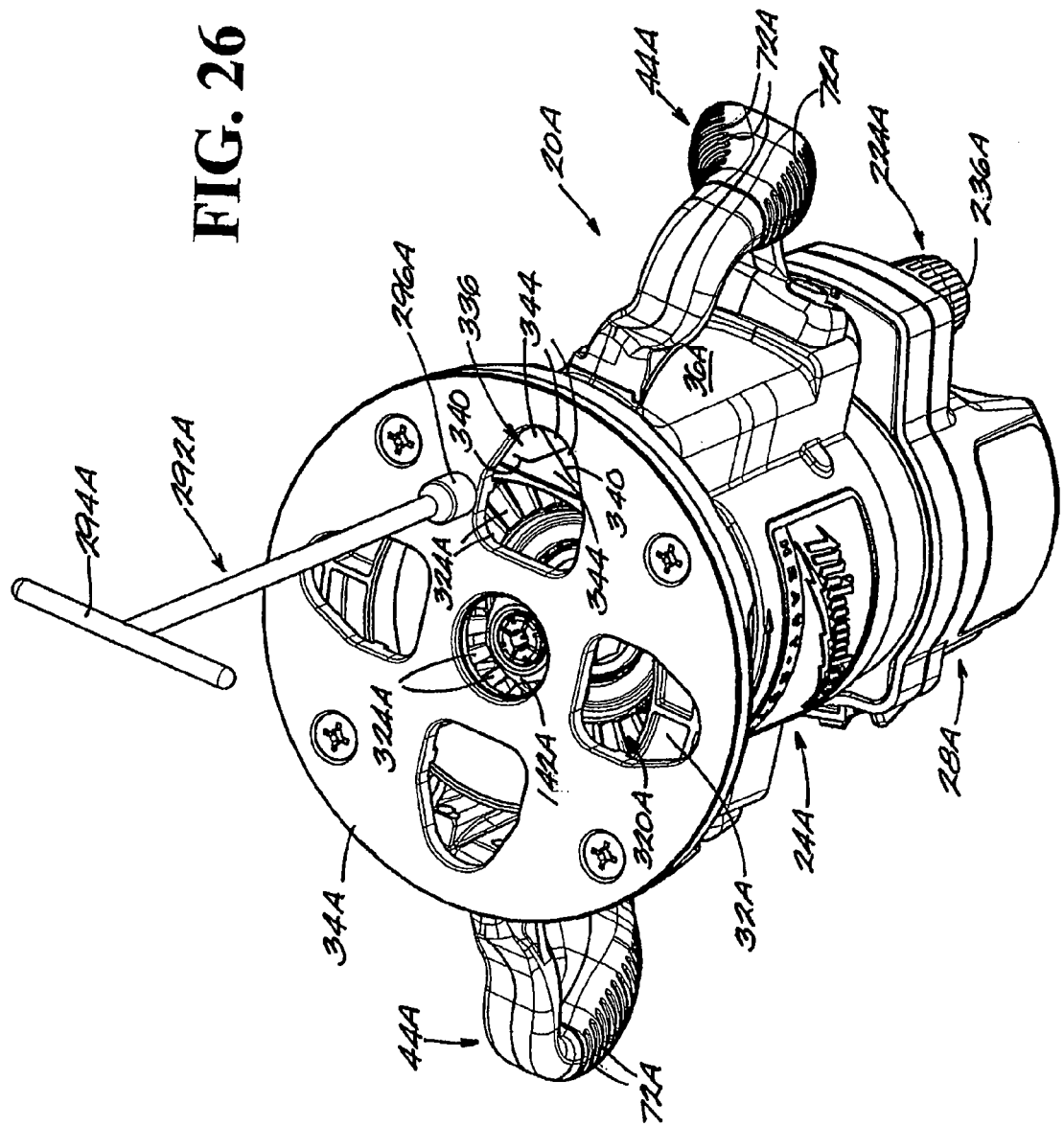
FIG. 26 is a bottom perspective view of the router base, the debris shield and an adjustment member.
Figure 27:
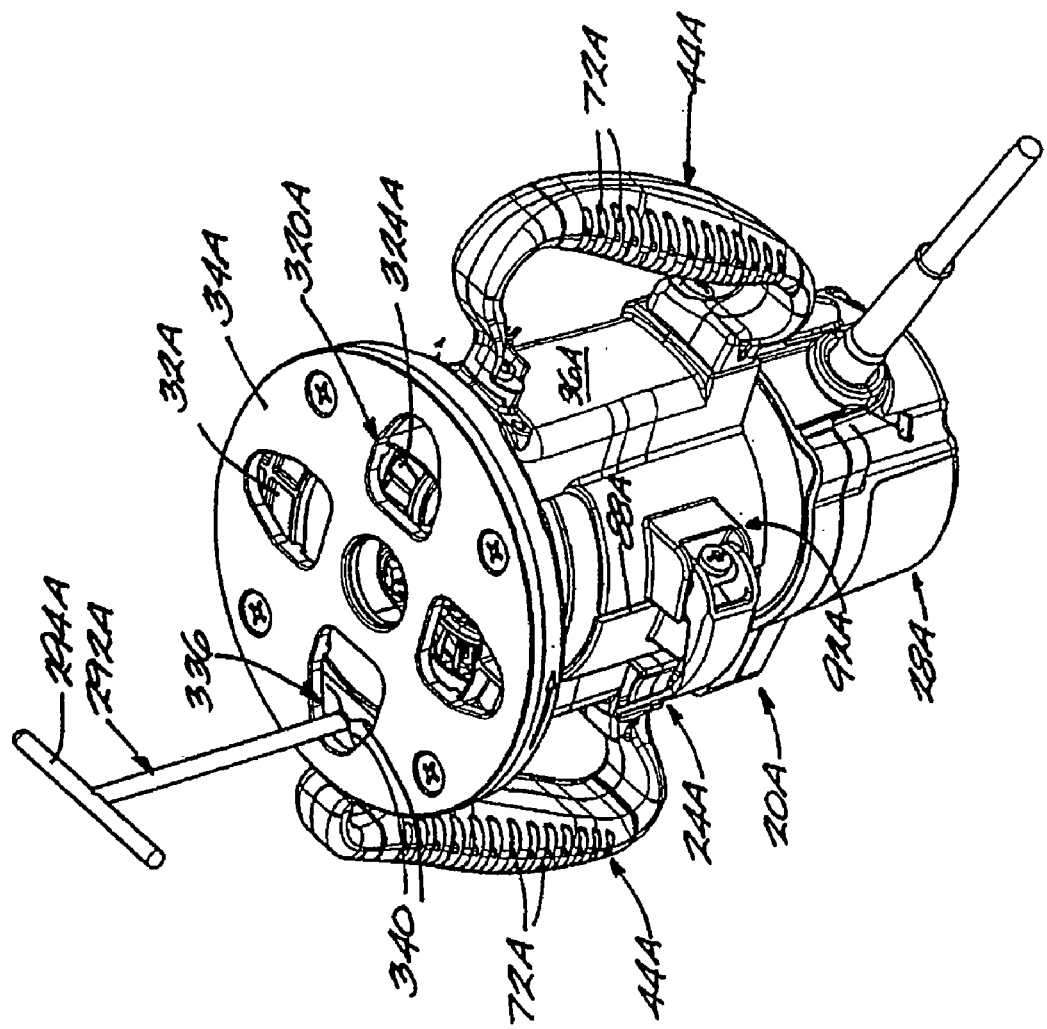
FIG. 27 is a bottom perspective view of the router and illustrating insertion of the adjustment member through the debris shield.
Figure 29:
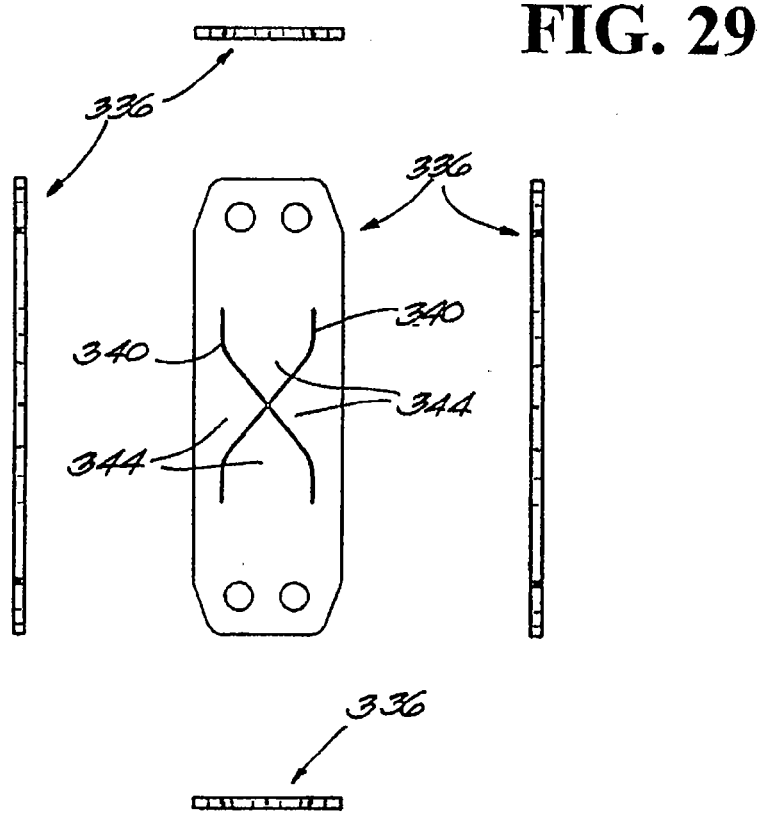
FIG. 29 are views of the debris shield.
Figure 28:
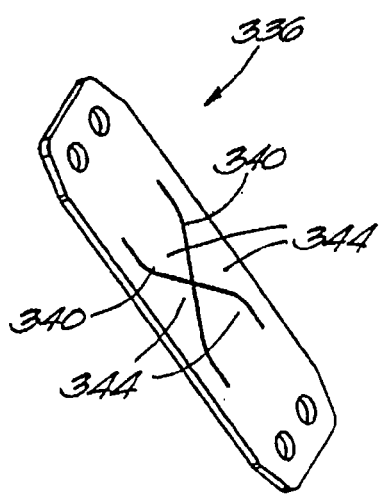
FIG. 28 is a perspective view of the debris shield.
Figure 30:
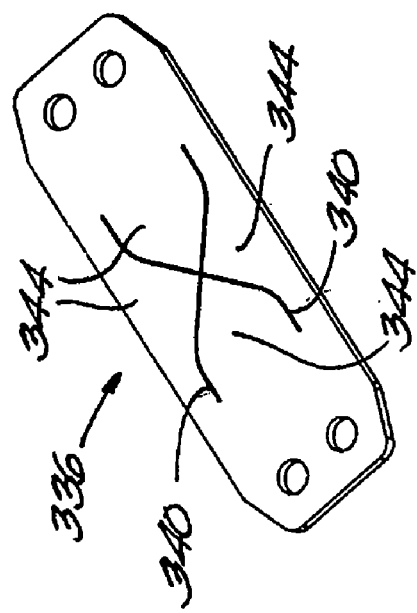
FIG. 30 is a perspective view of the debris shield.
Figure 31:
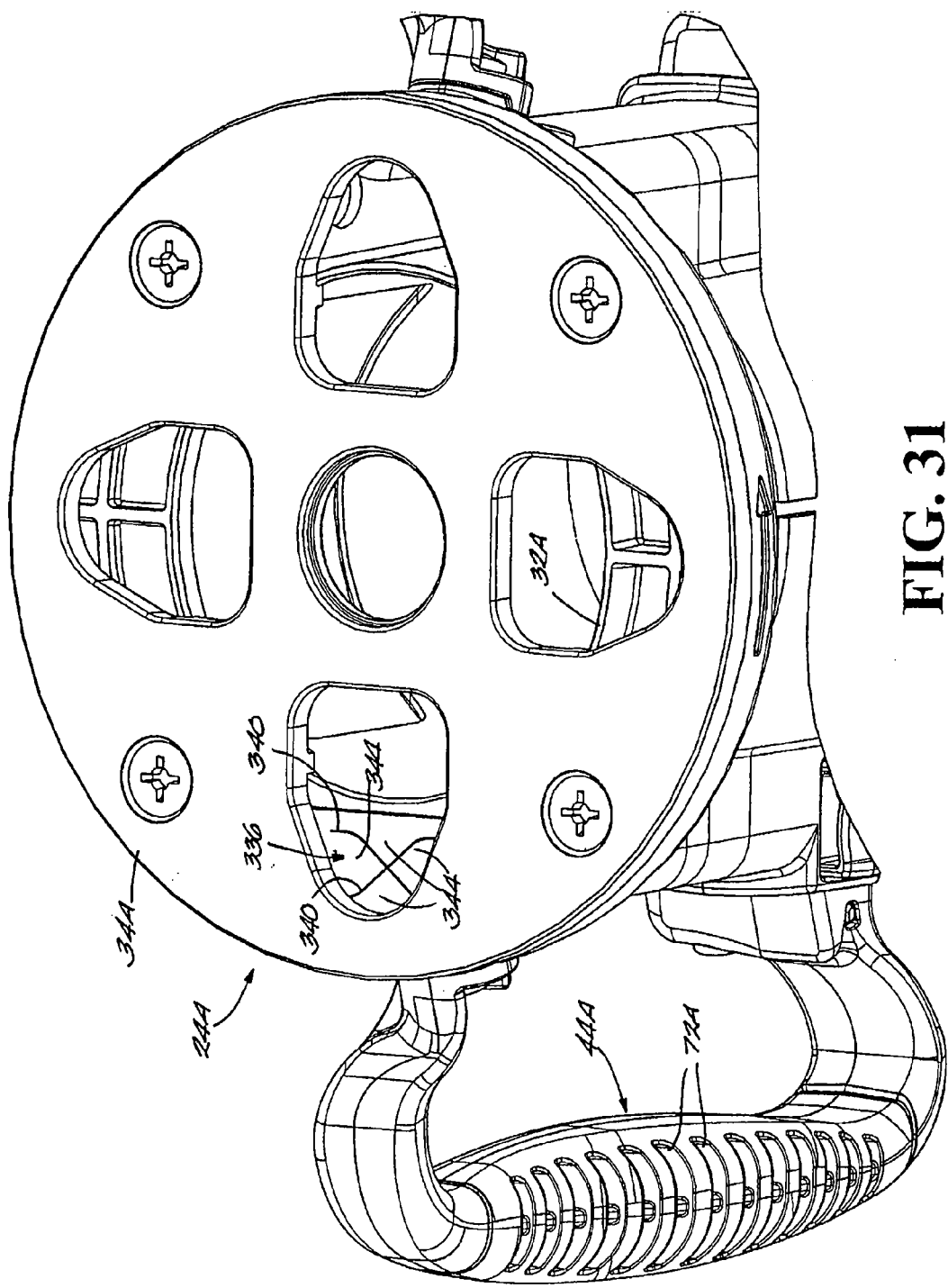
FIG. 31 is a bottom perspective view of the router base and the debris shield.
Figure 32:
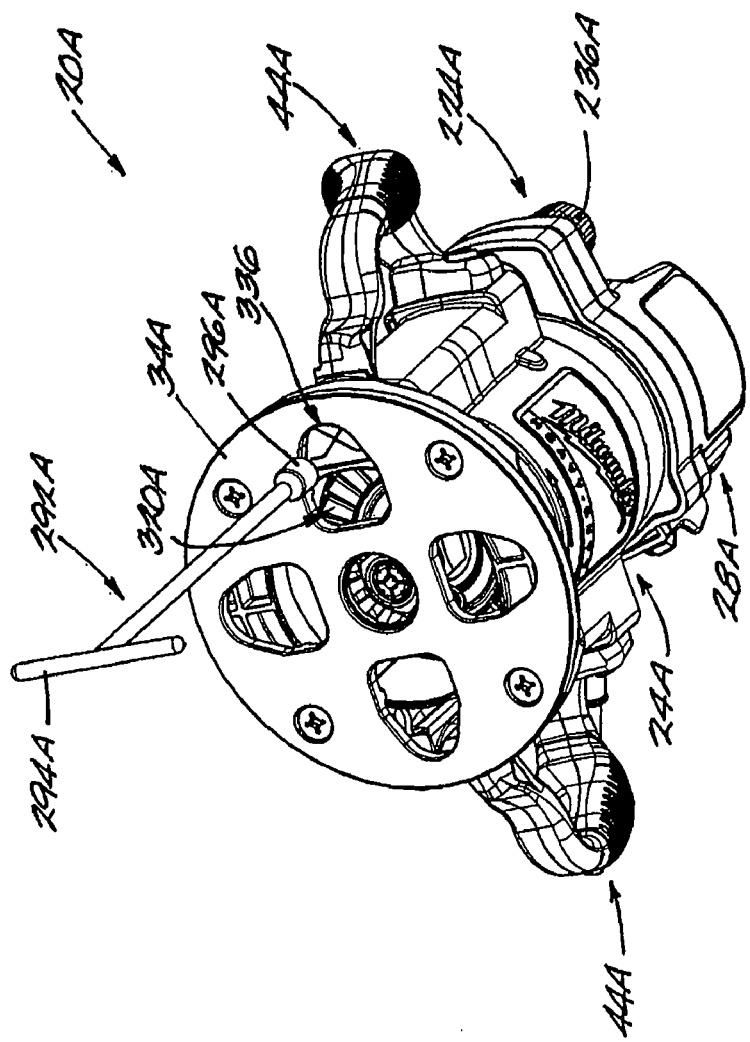
FIG. 32 is a bottom perspective view of the router, the debris shield and the adjustment member.
Figure 33:
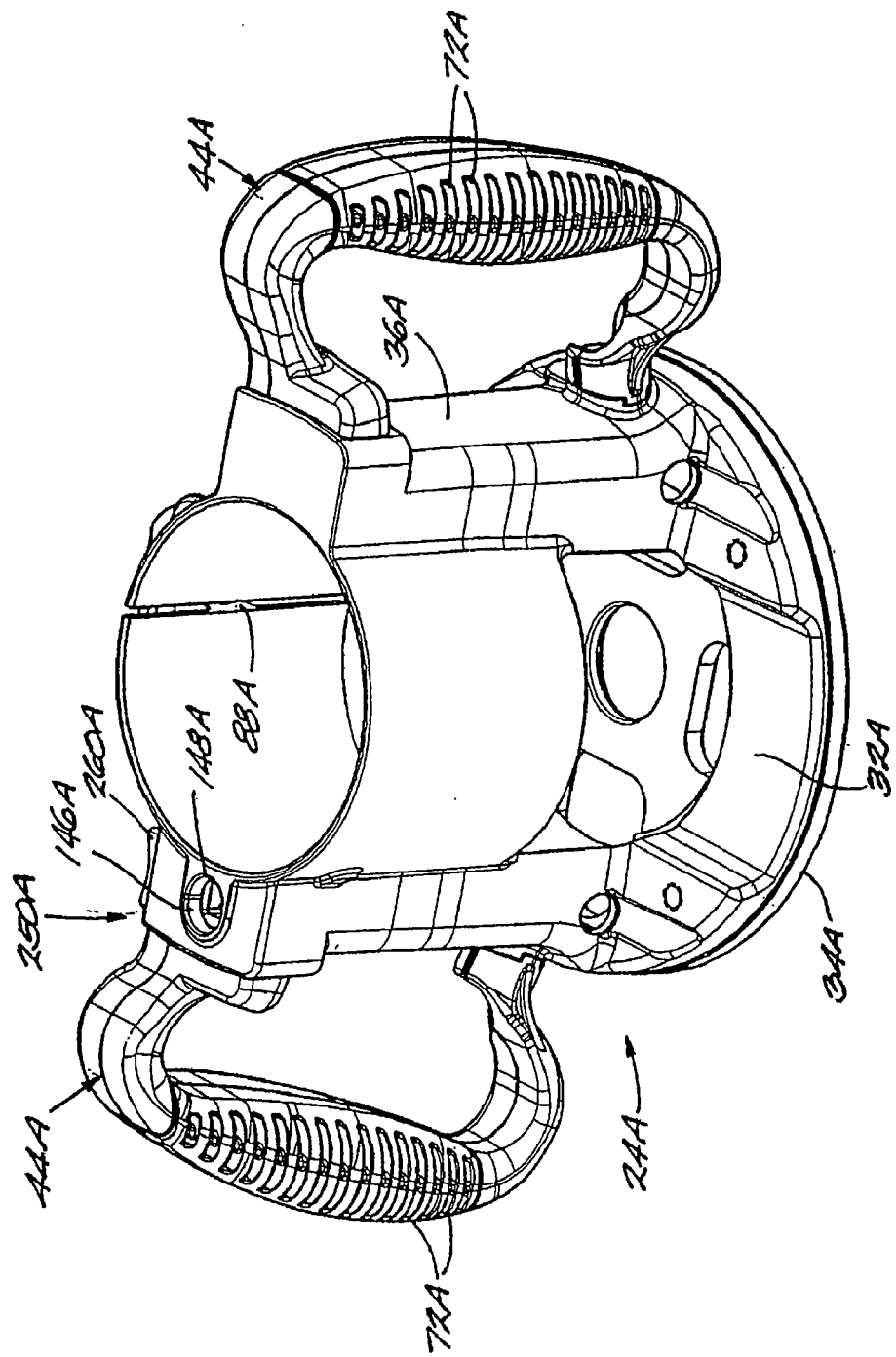
FIG. 33 is a front perspective view of the router base.
Figure 34:
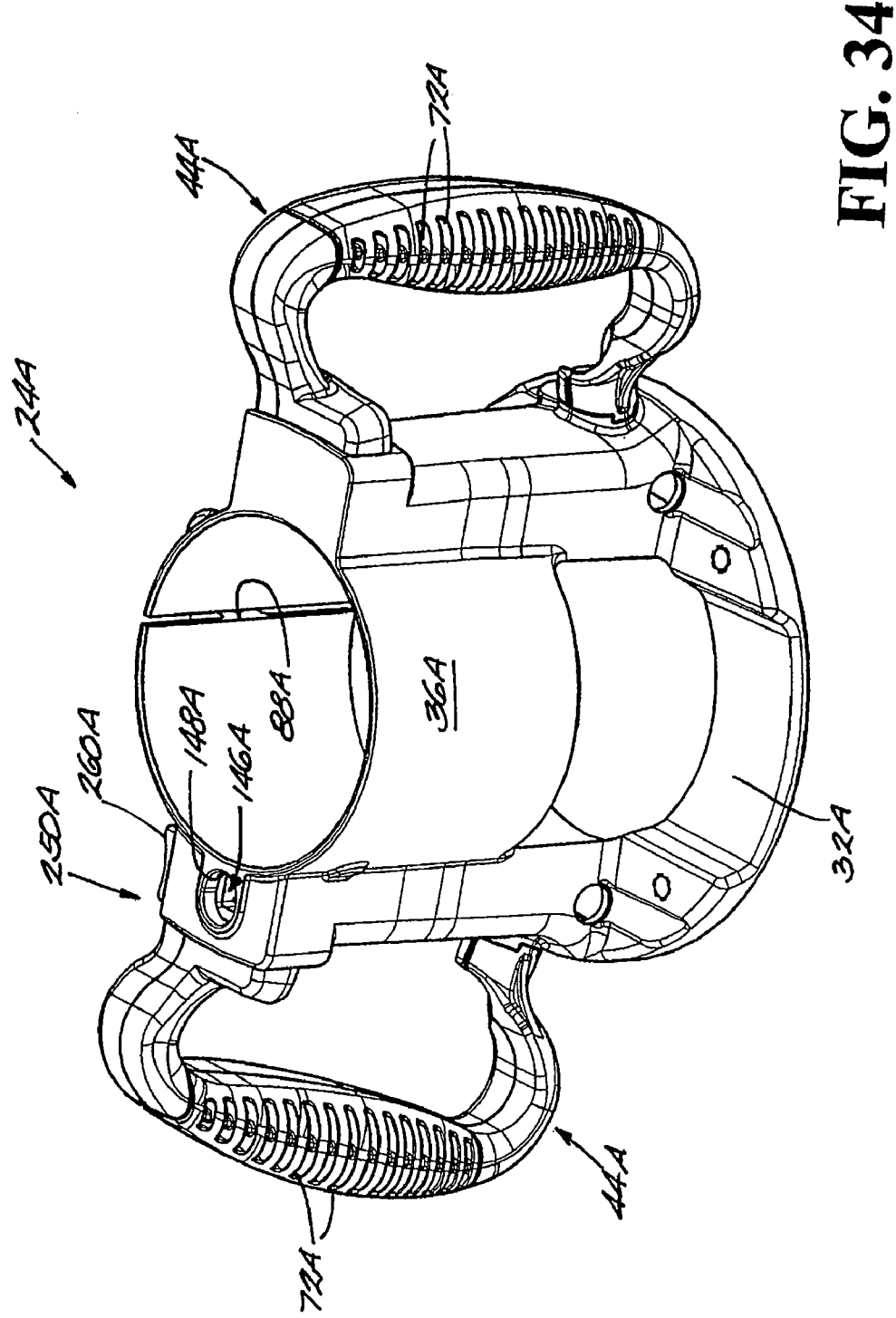
FIG. 34 is a front perspective view of the router base with portions removed.
Figure 35:
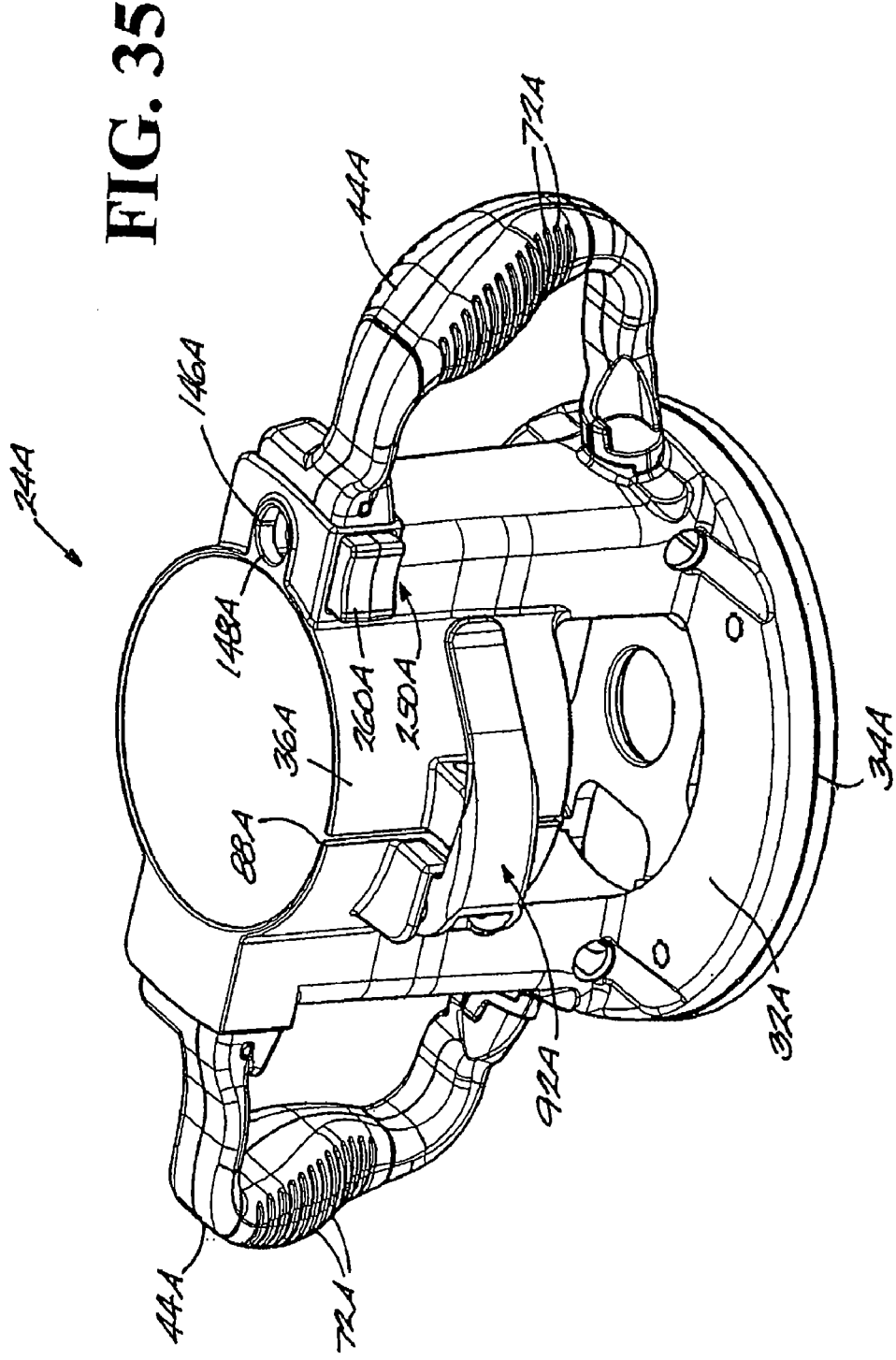
FIG. 35 is a rear perspective view of the router base.
Figure 36:
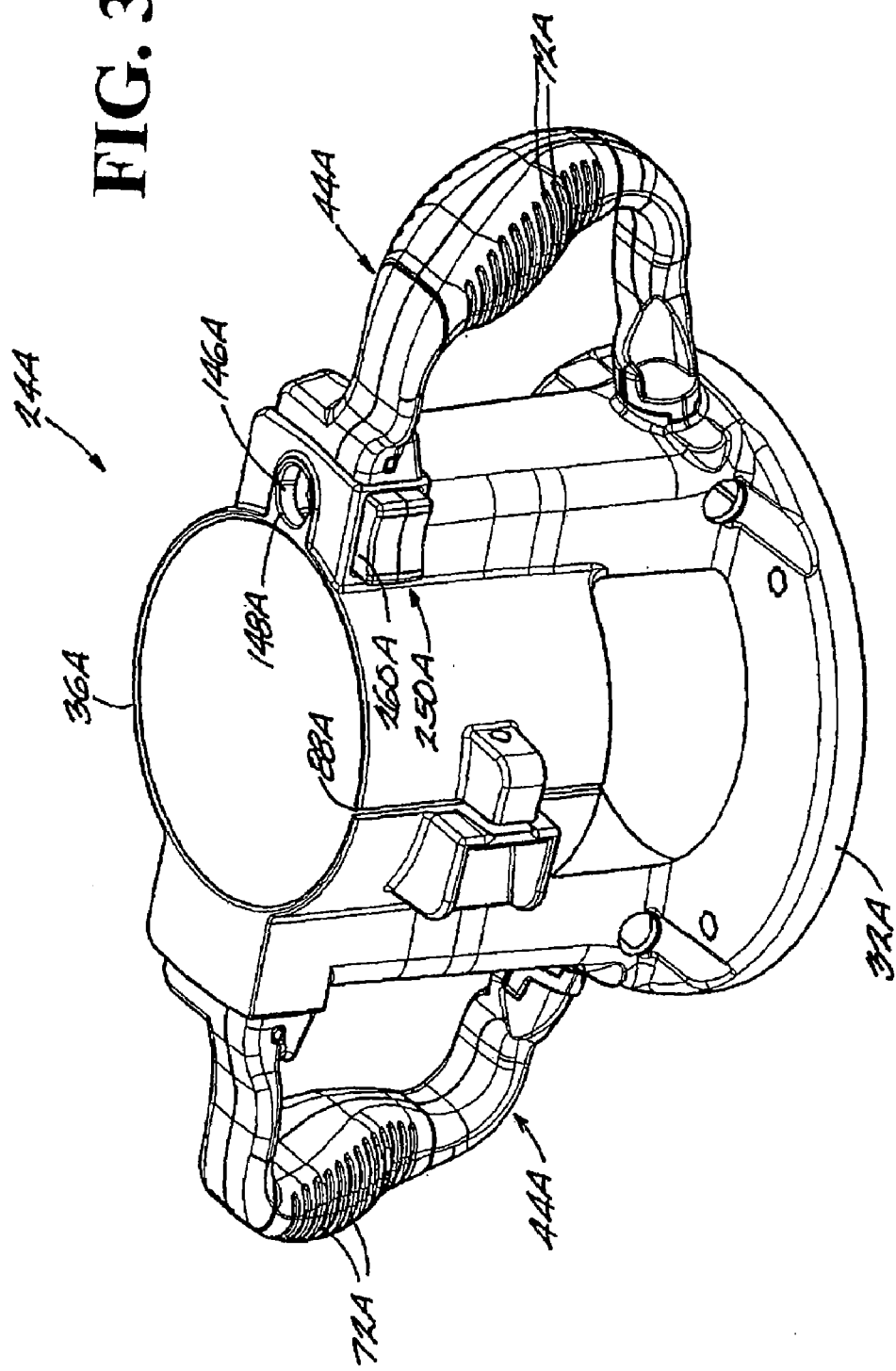
FIG. 36 is a rear perspective view of the router base with portions removed.
Figure 37:
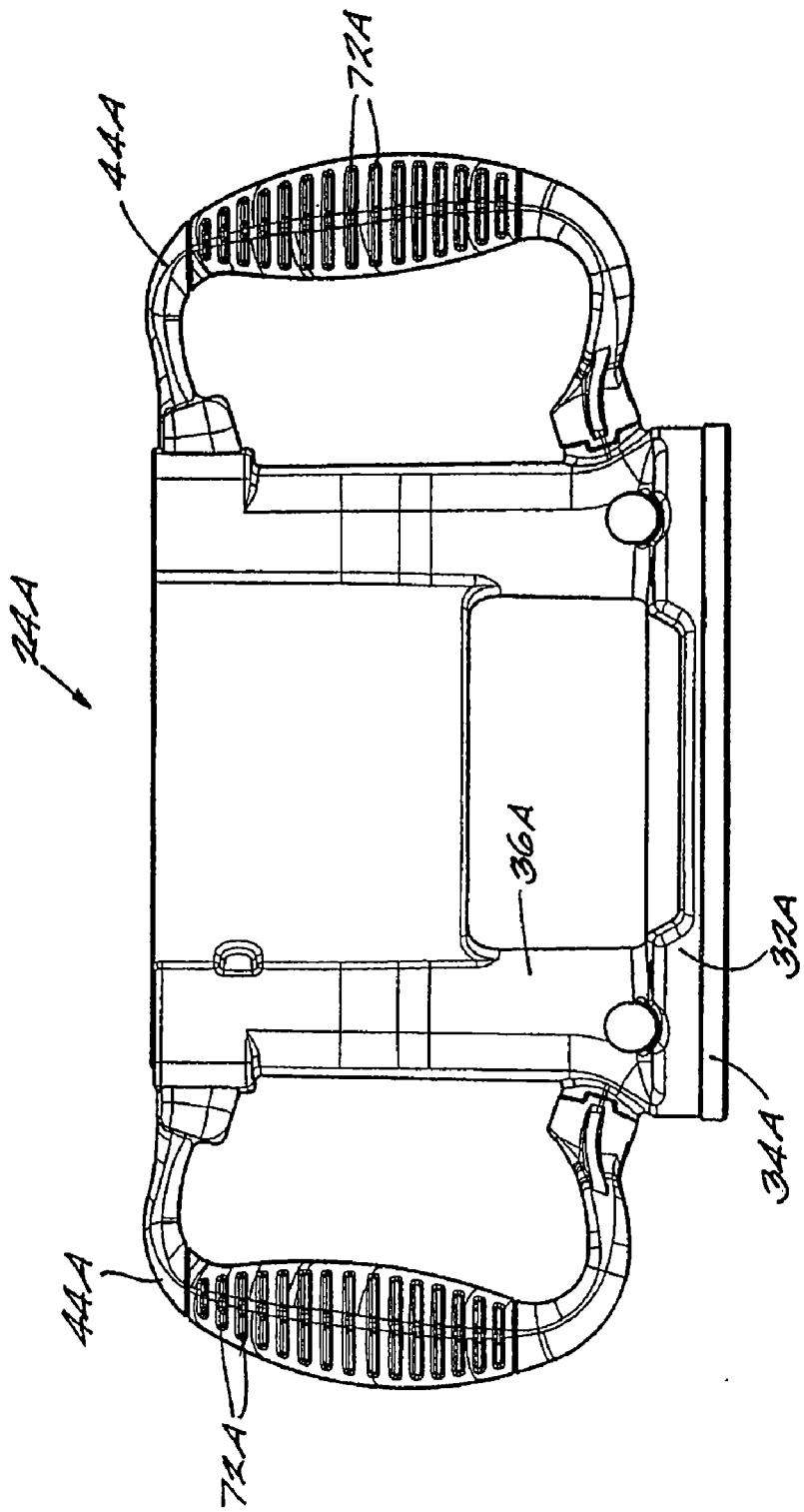
FIG. 37 is a front view of the router base.
Figure 38:
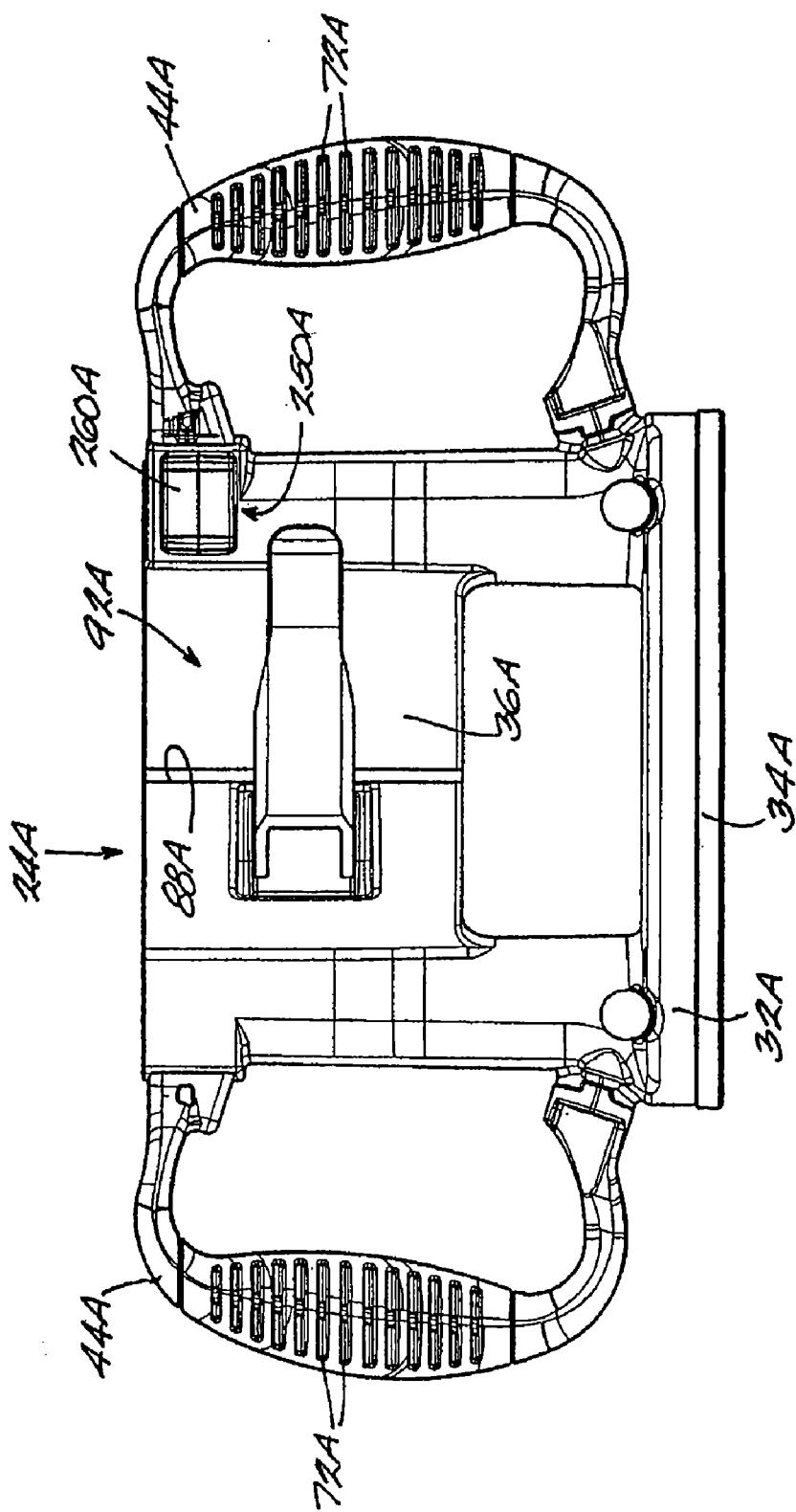
FIG. 38 is a rear view of the router base.
Figure 39:
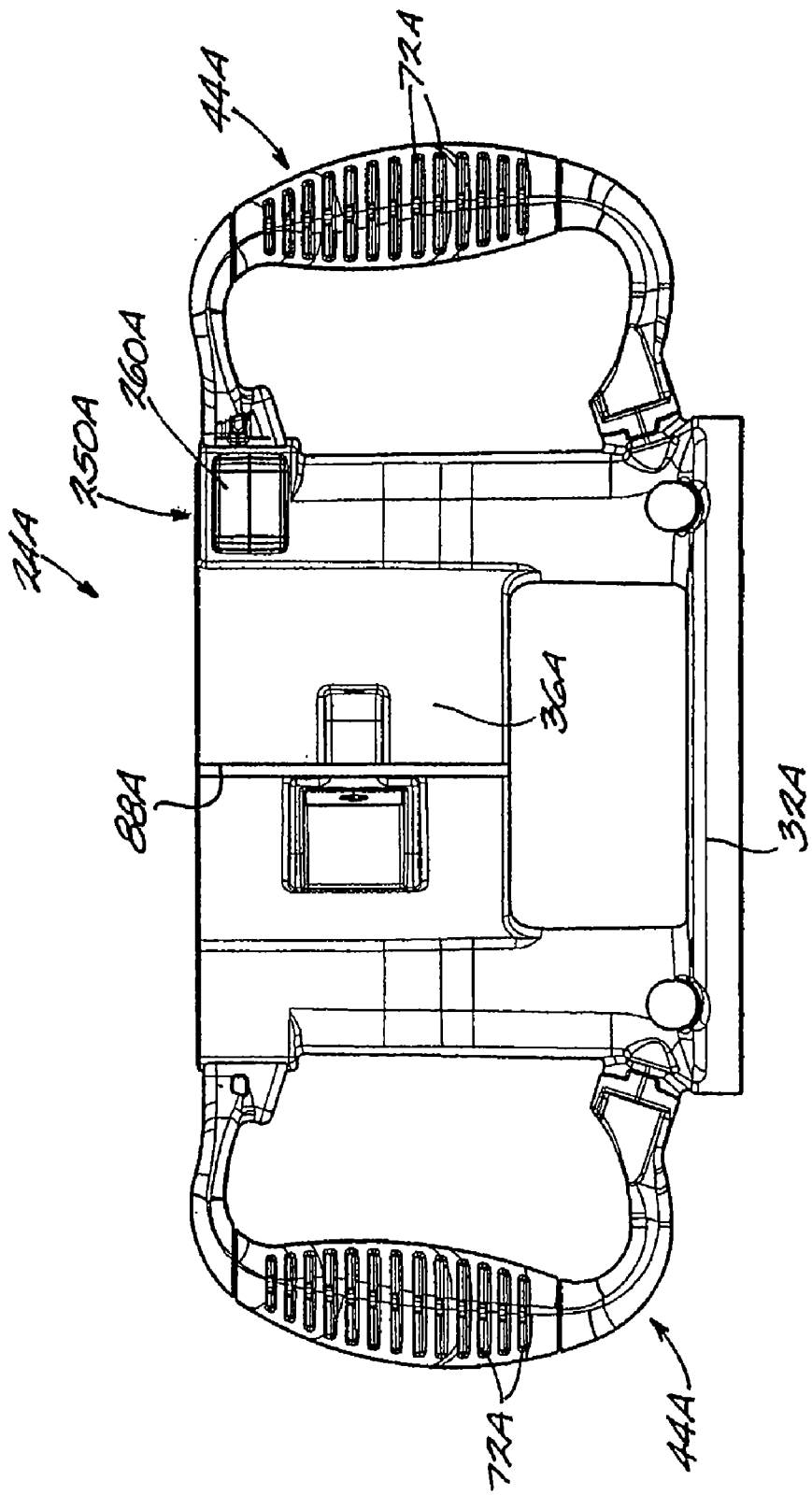
FIG. 39 is a rear view of the router base with portions removed.
Figure 40:
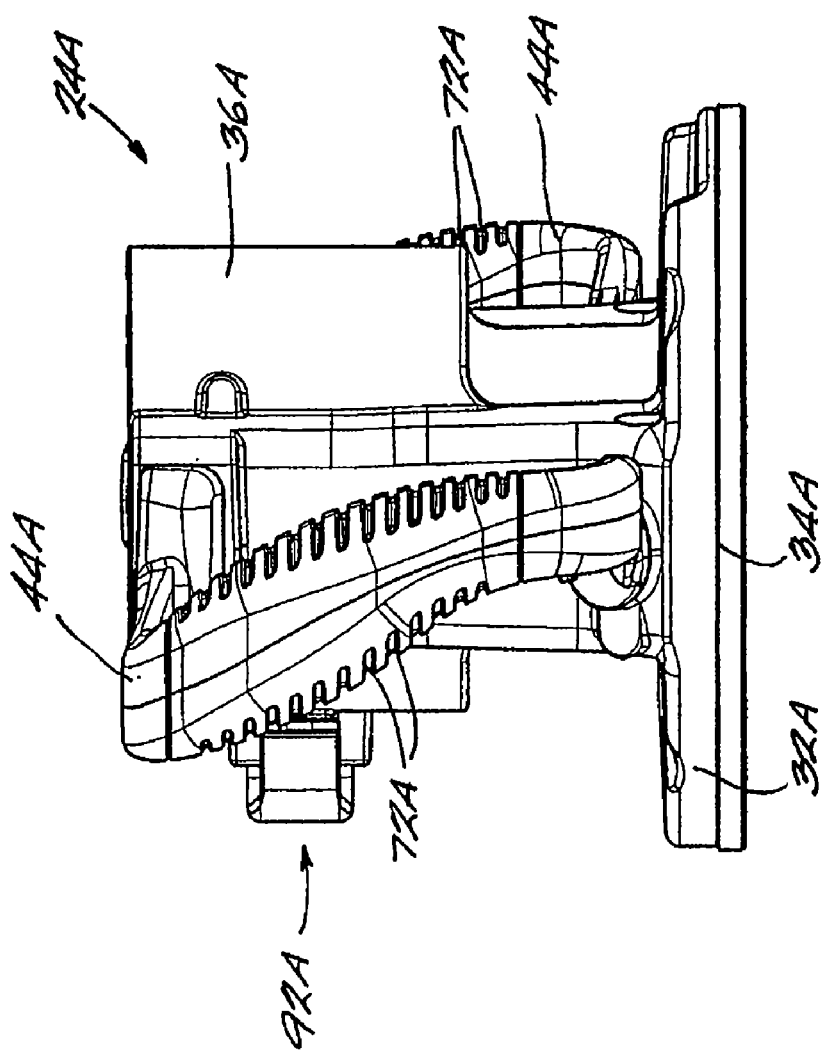
FIG. 40 is a left side view of the router base.
Figure 41:
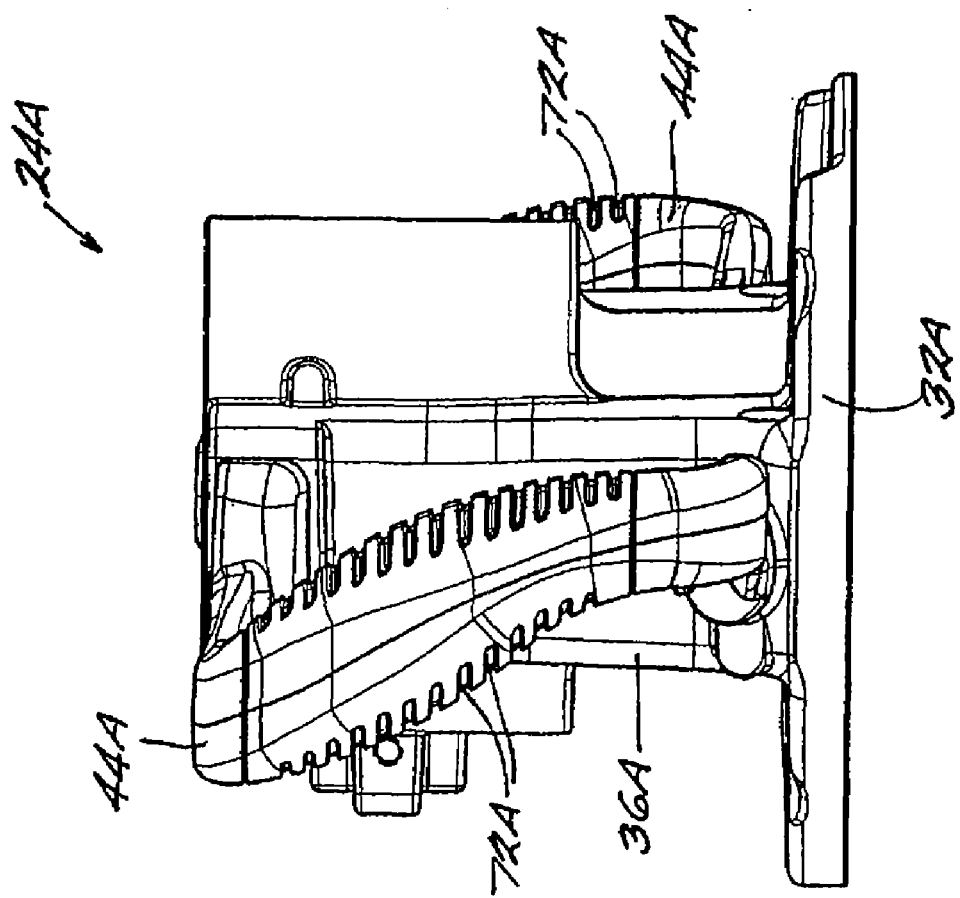
FIG. 41 is a left side view of the router base with portions removed.
Figure 42:
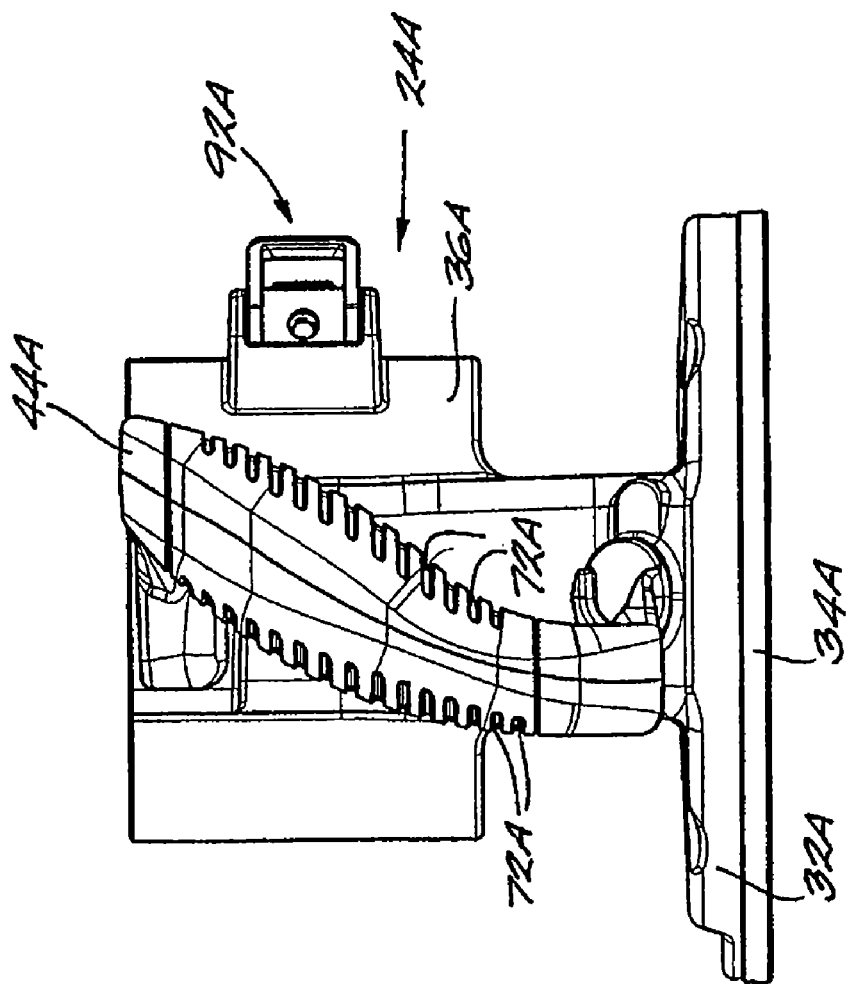
FIG. 42 is a right side view of the router base.
Figure 43:
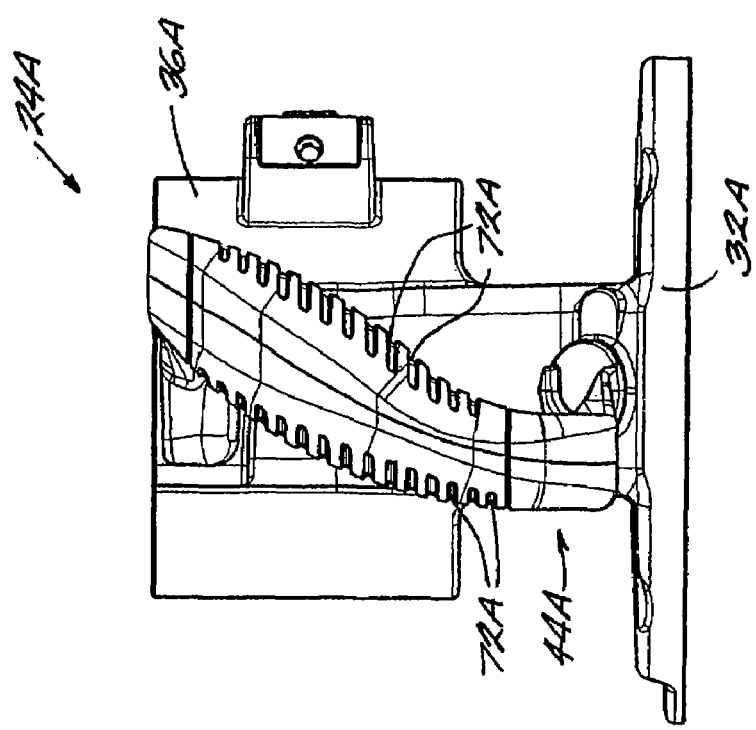
FIG. 43 is a right side view of the router base with portions removed.
Figure 44:
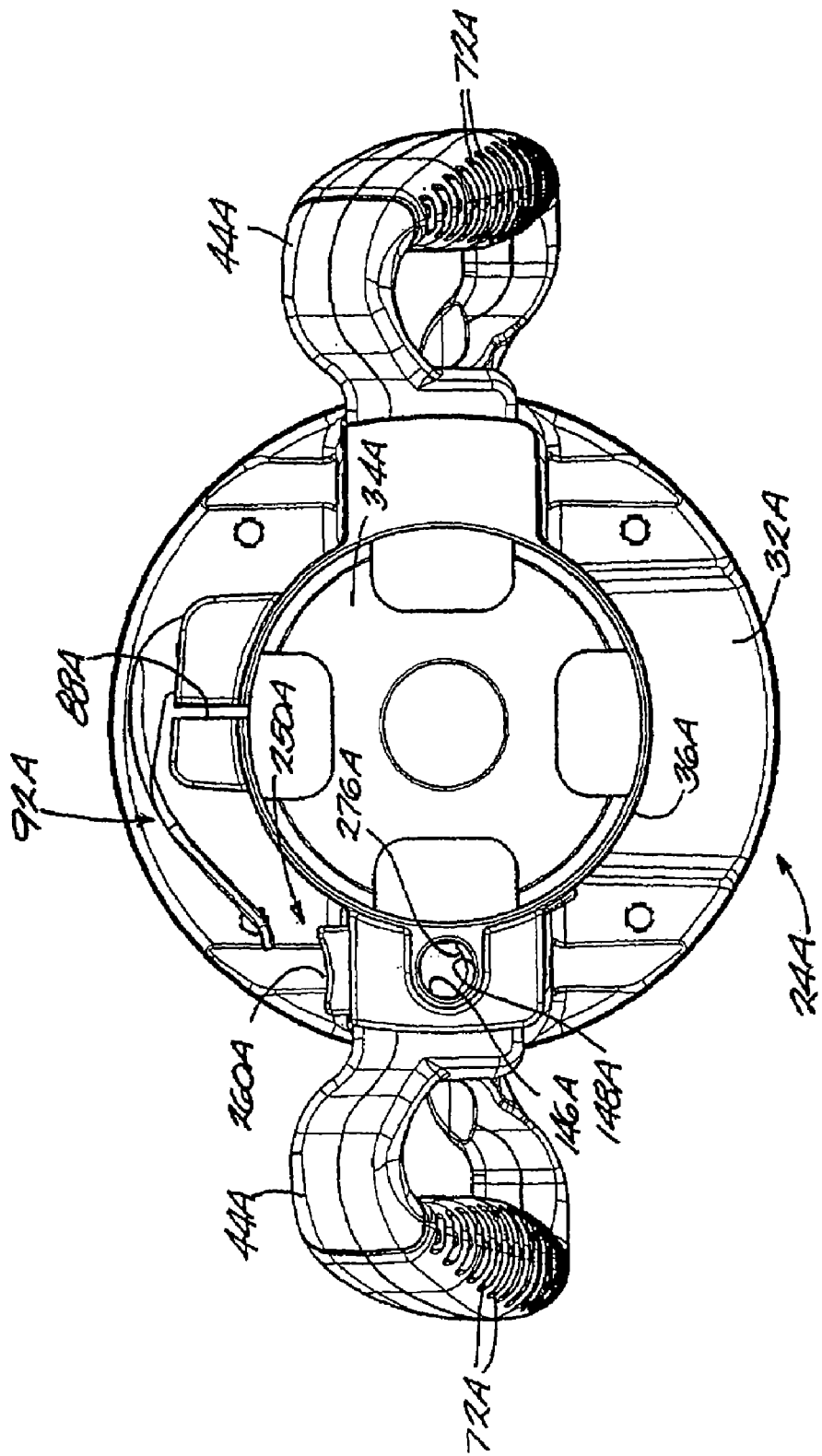
FIG. 44 is a top view of the router base.
Figure 45:
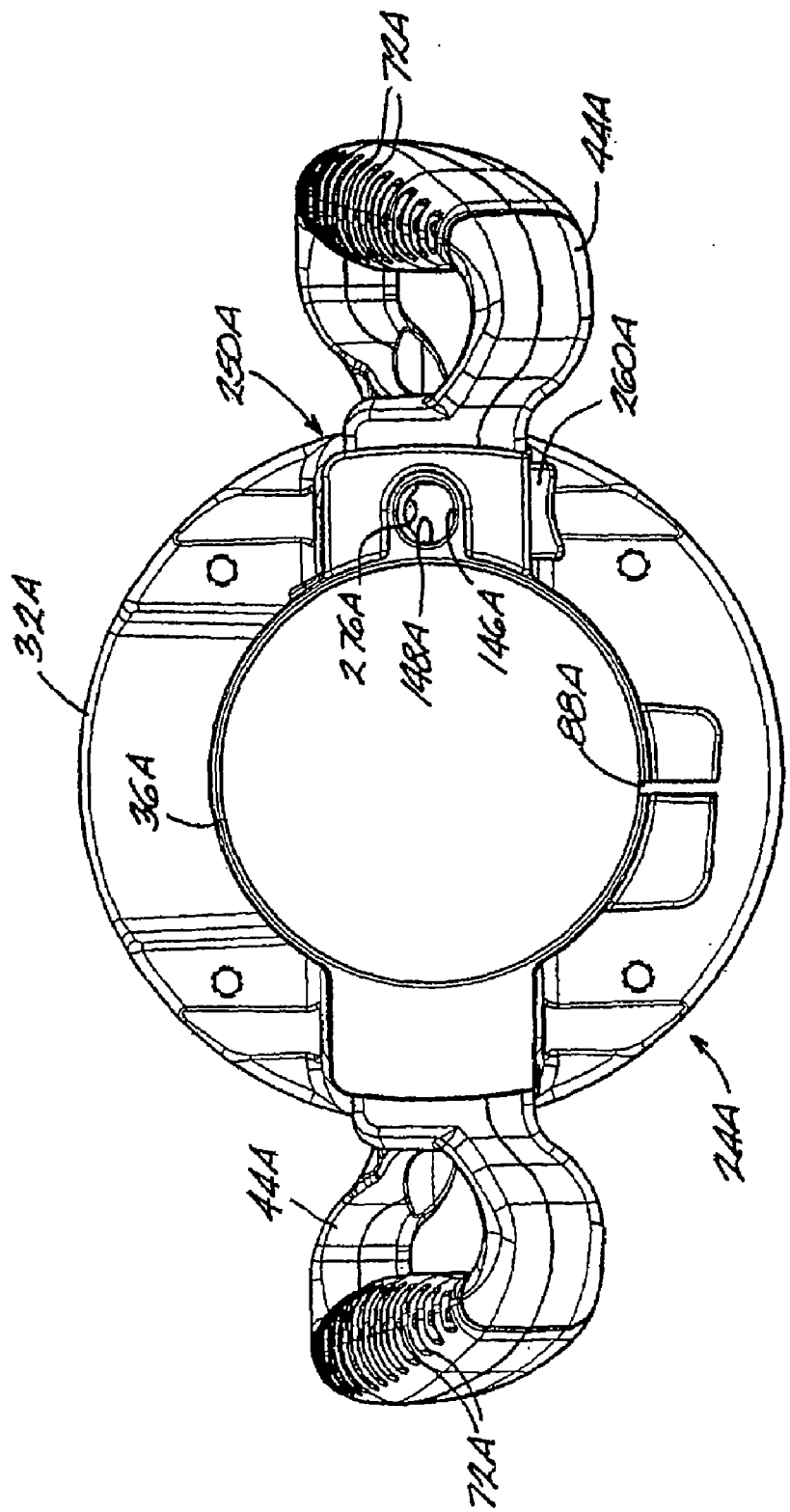
FIG. 45 is a top view of the router base with portions removed.
Figure 46:
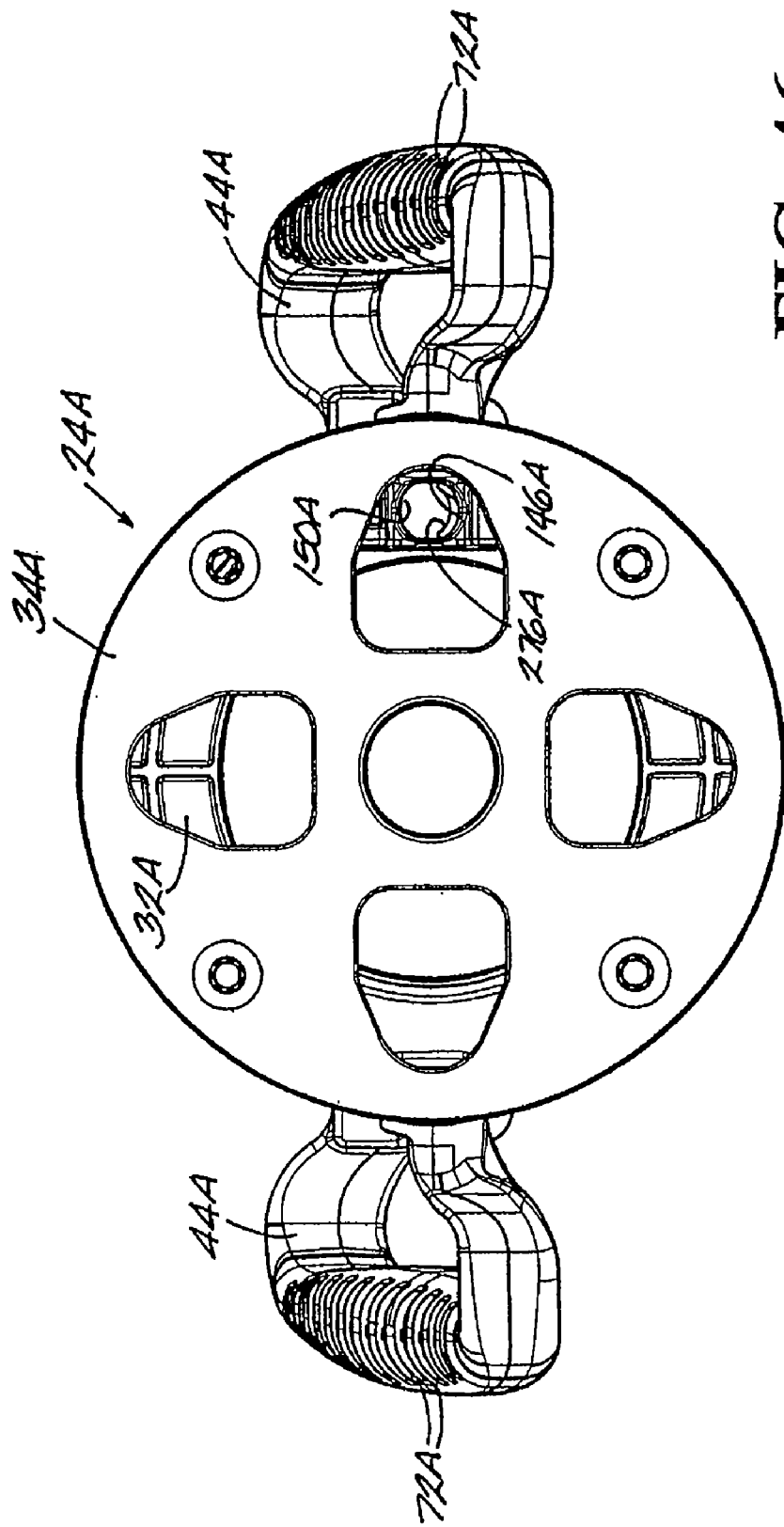
FIG. 46 is a bottom view of the router base.
Figure 47:
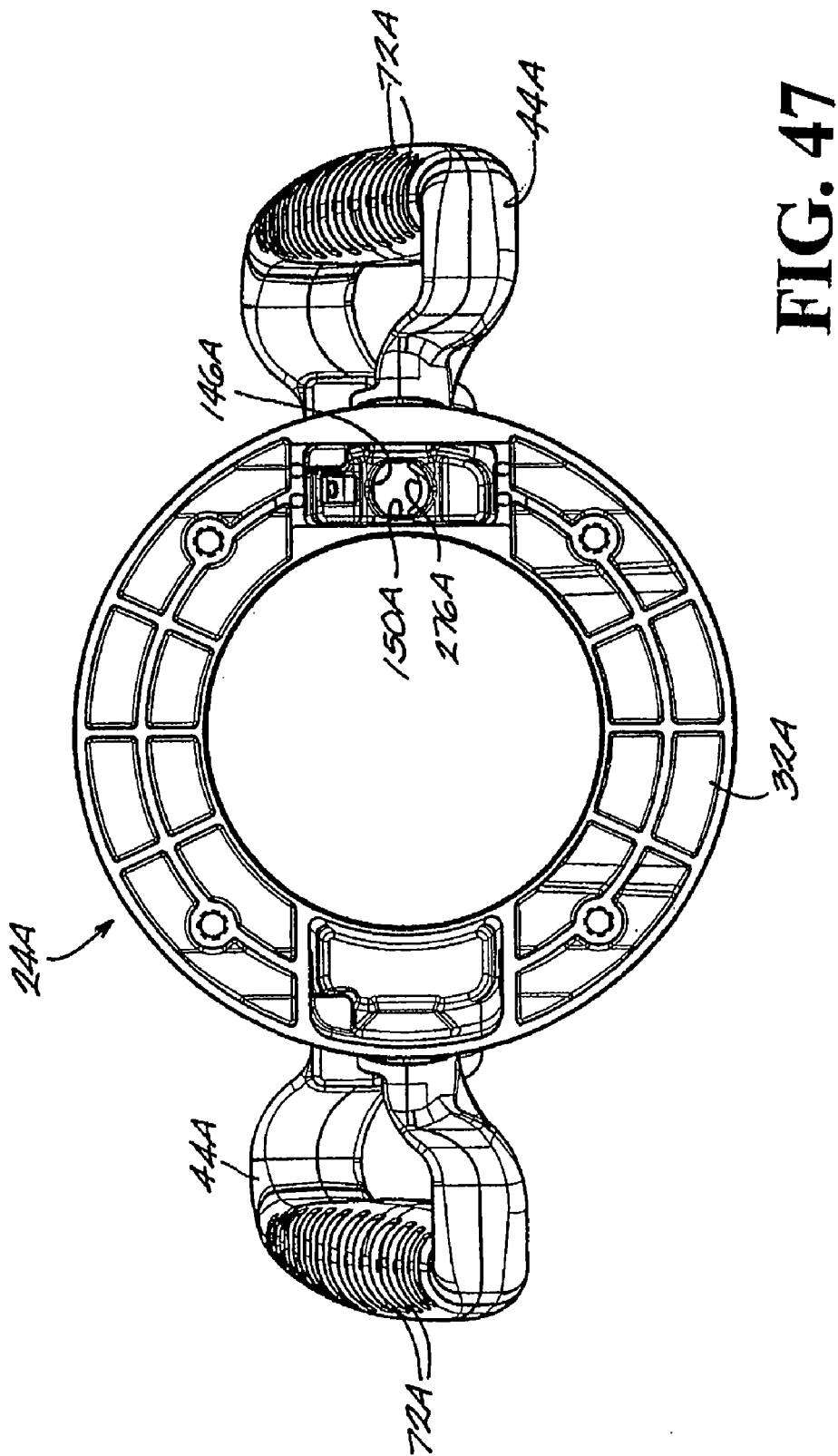
FIG. 47 is a bottom view of the router base with portions removed.
Figure 48:
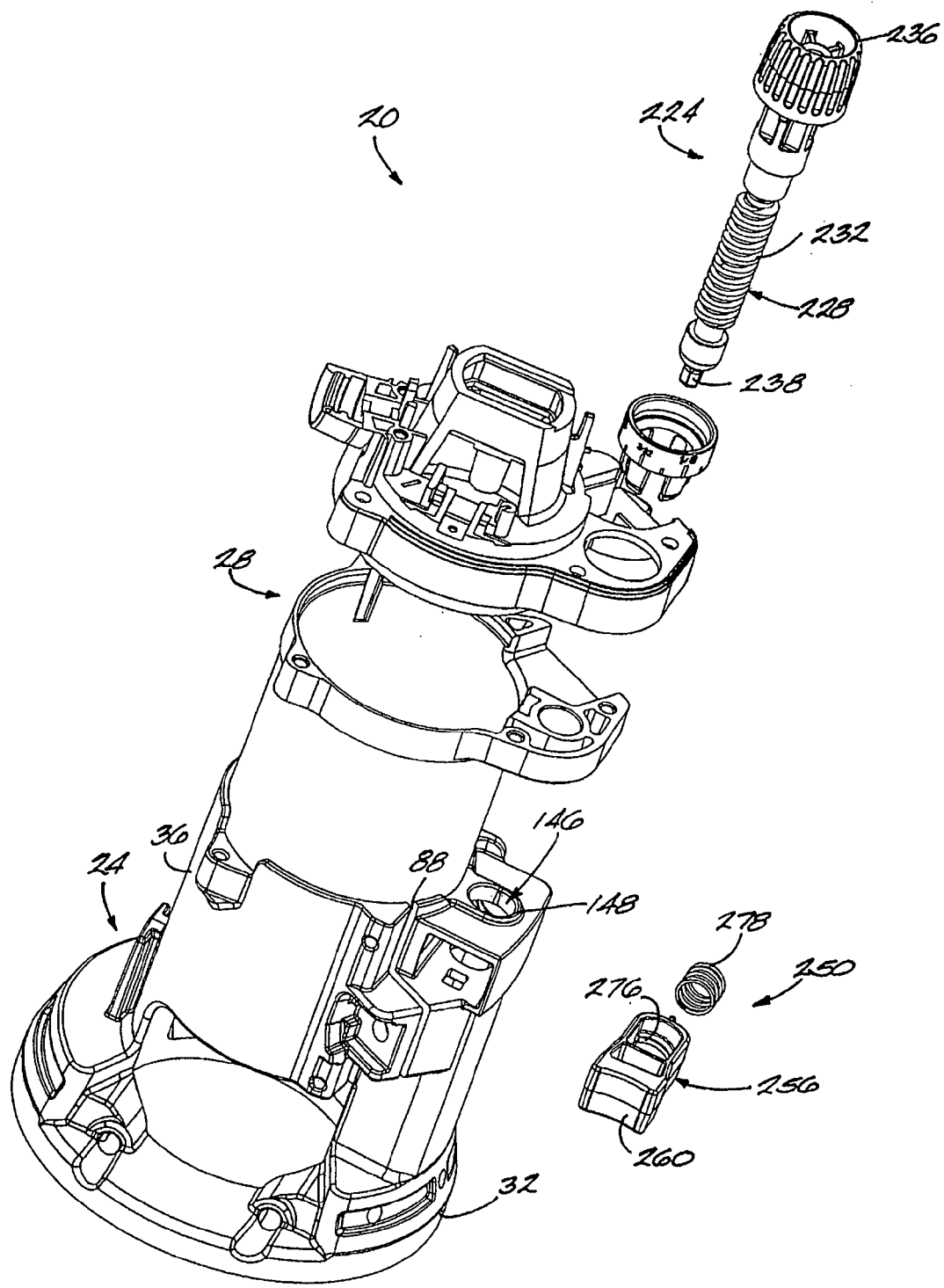
FIG. 48 is an exploded top perspective view of the router shown in FIG. 1.
Figure 52:
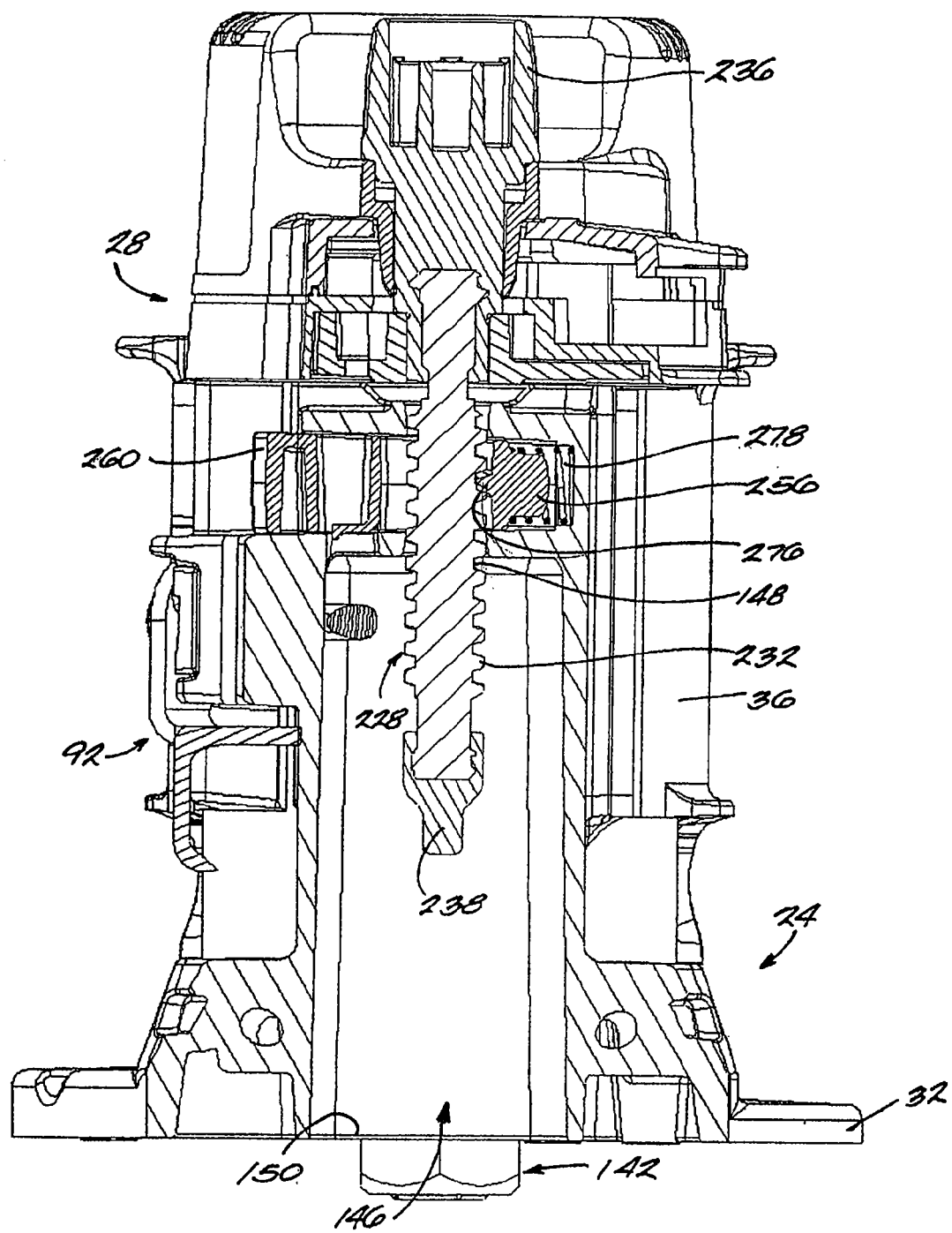
FIG. 52 is a cross-sectional view of the router shown in FIG. 1.

As shown in FIGS. 25-26, in the closed position, the shield 336 substantially closes the open bottom end 150 of the depth adjustment column 146 to provide a barrier into the depth adjustment column 146. As shown in FIG. 27, when the adjustment member 292 is inserted through the shield 336 and into the depth adjustment column 146, the shield 336 flexes to the open position, and the movable portions 344 move to provide an opening and to allow access to the depth adjustment column 146. Due to the resiliency and flexibility of the shield 336, the movable portions 344 engage the adjustment member 292 when it is inserted through the shield 336 to form a relatively tight seal between the adjustment member 292 and the shield 336. This engagement inhibits entry of debris into the depth adjustment column 146 from the open bottom end 150 even when the adjustment member 292 is inserted through the shield 336 and into the depth adjustment column 146. In this position, the adjustment member 292 may be used to adjust the depth adjustment mechanism 224 to set the desired depth of cut of the tool element or cutting bit 31.

After the desired depth of cut position is set, the adjustment member 292 is removed. When the adjustment member 292 is removed, the shield 336 flexes to the closed position, and the movable portions 344 move to close the opening into the depth adjustment column 146. The router 20 or 20A may then be operated (in the inverted position or in the normal, upright position) without debris entering the depth adjustment column 146.

It should be understood that the shield 336 may be used with the router 20 or 20A or with other routers (not shown).

It should be understood that, in accordance with aspects of the invention, the shield 336 may be used with other power tools which may be used in an inverted position or which may have an opening through which debris or contaminants may enter. In addition, in accordance with aspects of the invention, a removable debris shield (not shown) may be designed for use with other power tools to selectively close the access openings required for operation of the power tool. One or more independent features or independent advantages of the invention may be set forth in the following claims:

We claim:

1. A router comprising:
   a base operable to support the router relative to a workpiece;
   a motor housing supported by the base and defining a central axis and an air outlet, the air outlet having portions thereof positioned on each of two opposing sides of the central axis, air passing from the motor housing through the air outlet;
   a motor supported by the motor housing and operable to drive a tool element to work on the workpiece, work on the workpiece creating debris; and
   a shield connectable to the motor housing in a position to at least partially cover the portions of the air outlet on the two opposing sides of the central axis, the shield, when connected to the motor housing, allowing flow through the air outlet during operation of the router;
   wherein the motor housing includes a plurality of housing blades spaced apart from one another to define openings therebetween, the openings at least partially defining the air outlet, and wherein the shield is positionable to at least partially cover at least one of the openings to limit entrance of debris into the motor housing through the air outlet.

2. The router of claim 1, wherein the shield includes a plurality of shield blades spaced apart from one another to define openings therebetween, the shield blades being offset from the housing blades to at least partially cover the openings between the housing blades.

3. The router of claim 1, wherein the plurality of housing blades are spaced apart from one another at a first distance to define the openings therebetween, and wherein the shield includes a plurality of shield blades spaced apart from one another at a second distance to define openings therebetween, the second distance being smaller than the first distance.

4. The router of claim 3, wherein the second distance is less than or equal to about half of the first distance.

5. The router of claim 1, wherein the openings defined by the spaced apart housing blades are housing openings and wherein the shield includes a plurality of shield blades spaced apart from one another to define shield openings therebetween.

6. The router of claim 5, wherein the housing openings have a first radial width measured between adjacent edges of two adjacent housing blades at a radial distance from the central axis of the motor housing, and wherein the shield is connectable to the motor housing such that a second radial width is measured between one of the adjacent edges of one of the housing blades and an edge of one of the shield blades at the radial distance, the second radial width being less than the first radial width.

7. The router of claim 6, wherein the second radial width is about half of the first radial width.

8. The router of claim 6, wherein the first radial width is about 0.3 inches and the second radial width is about 0.15 inches.

9. The router of claim 1, wherein the shield includes a plurality of shield blades spaced apart from one another to define openings therebetween, the shield being connected to the motor housing to at least partially cover each of the openings of the motor housing with at least one of the plurality of shield blades.

10. The router of claim 1, wherein the plurality of housing blades are operable to direct air along a path, and wherein the shield includes a plurality of shield blades spaced apart from one another to define openings therebetween, the plurality of shield blades being oriented to direct air substantially along the path.

11. The router of claim 1, wherein the motor includes a motor shaft, and wherein the motor housing includes a body and a bearing support, the plurality of housing blades extending between the body and the bearing support, the housing blades supporting the bearing support relative to the body, and wherein the bearing support supports a bearing for the motor shaft.

12. The router of claim 1, wherein the shield is substantially circular.

13. The router of claim 1, wherein the shield is made of plastic.

14. The router of claim 1, wherein the shield is made of nylon.

15. A router comprising:
   a base operable to support the router relative to a workpiece;
   a motor housing supported by the base and defining a central axis and an air outlet, the air outlet having portions thereof positioned on each of two opposing sides of the central axis, air passing from the motor housing through the air outlet;
   a motor supported by the motor housing and operable to drive a tool element to work on the workpiece, work on the workpiece creating debris; and
   a shield connectable to the motor housing in a position to at least partially cover the portions of the air outlet on the two opposing sides of the central axis to limit entrance of debris into the motor housing through the air outlet, the shield, when connected to the motor housing, allowing flow through the air outlet during operation of the router;
   wherein the shield includes a plurality of radially extending shield blades spaced apart from one another to define openings therebetween.

16. The router of claim 15, wherein the plurality of radially extending shield blades are oriented to direct air passing through the air outlet and the openings along a desired path.

17. The router of claim 15, wherein the plurality of radially extending shield blades have a thickness of about 0.05 inches.

18. A router comprising:
   a base operable to support the router relative to a workpiece;
   a motor housing supported by the base and defining a central axis and an air outlet, the air outlet having portions thereof positioned on each of two opposing sides of the central axis, air passing from the motor housing through the air outlet;
   a motor supported by the motor housing and operable to drive a tool element to work on the workpiece, work on the workpiece creating debris; and
   a shield connectable to the motor housing in a position to at least partially cover the portions of the air outlet on the two opposing sides of the central axis to limit entrance of debris into the motor housing through the air outlet, the shield, when connected to the motor housing, allowing flow through the air outlet during operation of the router;
   wherein the router has an upright orientation, in which the base is supported above a workpiece and the shield is below the air outlet, and an inverted orientation, in which the base is below a workpiece and the shield is above the air outlet, the shield being operable to inhibit movement of debris through the air outlet and into the motor housing when the router is in the inverted orientation.

19. A power tool comprising:
a motor operable to drive a tool element to work on a workpiece, work on the workpiece creating debris;
a motor housing supporting the motor and defining an air outlet and an air flow path from the motor housing through the air outlet; and
a shield removably connectable to the motor housing, the shield being positionable at least partially outside the motor housing and to at least partially cover the air outlet to limit entrance of debris into the motor housing through the air outlet;
wherein the motor housing includes a plurality of housing blades spaced apart from one another to define openings therebetween, the openings at least partially defining the air outlet, and wherein the shield is positionable to at least partially cover at least one of the openings.

20. The power tool of claim 19, wherein the power tool is a router, the router further comprising a base operable to support the router relative to the workpiece.

21. The power tool of claim 19, wherein the shield includes a plurality of shield blades spaced apart from one another to define openings therebetween, the shield blades being offset from the housing blades to at least partially cover the openings between the housing blades.

22. The power tool of claim 19, wherein the plurality of housing blades are spaced apart from one another at a first distance to define the openings therebetween, and wherein the shield includes a plurality of shield blades spaced apart from one another at a second distance to define openings therebetween, the second distance being smaller than the first distance.

23. The power tool of claim 22, wherein the second distance is less than or equal to about half of the first distance.

24. The power tool of claim 19, wherein the openings defined by the spaced apart plurality of housing blades are housing openings, and wherein the shield includes a plurality of shield blades spaced apart from one another to define shield openings therebetween.

25. The power tool of claim 24, wherein the housing openings have a first radial width measured between adjacent edges of two adjacent housing blades at a radial distance from the central axis of the motor housing, and wherein the shield is connectable to the motor housing such that a second radial width is measured between one of the adjacent edges of one of the housing blades and an edge of one of the shield blades at the radial distance, the second radial width being less than the first radial width.

26. The power tool of claim 25, wherein the second radial width is about half of the first radial width.

27. The power tool of claim 25, wherein the first radial width is about 0.3 inches and the second radial width is about 0.15 inches.

28. The power tool of claim 19, wherein the shield includes a plurality of shield blades spaced apart from one another to define openings therebetween, the shield being connected to the motor housing to at least partially cover each of the openings of the motor housing with at least one of the plurality of shield blades.

29. The power tool of claim 19, wherein the plurality of housing blades are operable to direct air along a path, and wherein the shield includes a plurality of shield blades spaced apart from one another to define openings therebetween, the plurality of shield blades being oriented to direct air substantially along the path.

30. The power tool of claim 19, wherein the motor includes a motor shaft, and wherein the motor housing includes a body and a bearing support, the plurality of housing blades extending between the body and the bearing support, the housing blades supporting the bearing support relative to the body, and wherein the bearing support supports a bearing for the motor shaft.

31. The power tool of claim 19, wherein the shield is substantially circular.

32. The power tool of claim 19, wherein the shield includes a plurality of blades spaced apart from one another to define openings therebetween.

33. The power tool of claim 19, wherein the power tool further comprises
a base, the motor housing being supported by the base and the central axis of the motor housing being generally vertical, and
a handle connected to at least one of the base and the motor housing, the handle defining a handle axis and having a grip portion extending generally along the handle axis, the handle axis being non-parallel to the central axis.

34. A power tool comprising:
a motor operable to drive a tool element to work on a workpiece, work on the workpiece creating debris;
a motor housing supporting the motor and defining an air outlet and an air flow path from the motor housing through the air outlet; and
a shield removably connectable to the motor housing, the shield being positionable at least partially outside the motor housing and to at least partially cover the air outlet to limit entrance of debris into the motor housing through the air outlet;
wherein the shield includes a plurality of radially extending shield blades spaced apart from one another to define openings therebetween.

35. The power tool of claim 34, wherein the plurality of radially extending shield blades are oriented to direct air passing through the air outlet and the openings along a desired path.

36. The power tool of claim 34, wherein the plurality of radially extending shield blades have a thickness of about 0.05 inches.

37. A router comprising:
a base operable to support the router relative to a workpiece;
a motor operable to drive a tool element to work on a workpiece, work on the workpiece creating debris;
a motor housing supported by the base and supporting the motor and defining an air outlet and an air flow path from the motor housing through the air outlet; and
a shield removably connectable to the motor housing, the shield being positionable at least partially outside the motor housing and to at least partially cover the air outlet to limit the entrance of debris into the motor housing through the air outlet;
wherein the router has an upright orientation, in which the base is supported above a workpiece and the shield is below the air outlet, and an inverted orientation, in which the base is below a workpiece and the shield is above the air outlet, the shield being operable to inhibit movement of debris through the air outlet and into the motor housing when the router is in the inverted orientation.

38. A power tool comprising:
a motor operable to drive a tool element to work on a workpiece, work on the workpiece creating debris;

a motor housing supporting the motor and defining an air outlet and an air flow path from the motor housing through the air outlet;

a shield removably connectable to the motor housing and positionable to at least partially cover the air outlet to limit entrance of debris into the motor housing through the air outlet;

a base, the motor housing being supported by the base and being movable relative to the base, at least one of the base and the motor housing defining a depth adjustment column having an open end, the motor being operable to drive a tool element, the base being operable to support the power tool relative to a workpiece;

a depth adjustment mechanism supported in the depth adjustment column and being operable to adjust the cutting depth of the tool element, and a flexible shield connectable to the base in a position to cover the open end and to allow access to the depth adjustment mechanism through the open end.

* * * * *